United States Patent
Nakao

(10) Patent No.: US 9,041,976 B2
(45) Date of Patent: May 26, 2015

(54) SERVER DEVICE, ASSOCIATION PROCESS FLOW DETERMINING METHOD, AND IMAGE PROCESSING SYSTEM

(71) Applicant: Kenta Nakao, Tokyo (JP)

(72) Inventor: Kenta Nakao, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 105 days.

(21) Appl. No.: 13/705,220

(22) Filed: Dec. 5, 2012

(65) Prior Publication Data
US 2013/0148137 A1  Jun. 13, 2013

(30) Foreign Application Priority Data

Dec. 13, 2011   (JP) .................................. 2011-272417

(51) Int. Cl.
| | |
|---|---|
| *H04N 1/60* | (2006.01) |
| *G06F 3/12* | (2006.01) |
| *G06K 15/00* | (2006.01) |
| *H04N 1/00* | (2006.01) |

(52) U.S. Cl.
CPC ....... *H04N 1/00954* (2013.01); *H04N 1/00244* (2013.01); *H04N 2201/0081* (2013.01); *H04N 2201/0094* (2013.01); *H04N 2201/001* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,278,901 | B1 * | 8/2001 | Winner et al. | .................. 700/99 |
| 2011/0026064 | A1 | 2/2011 | Kato et al. | |
| 2011/0116127 | A1 * | 5/2011 | Nakawaki | .................... 358/1.15 |
| 2011/0292412 | A1 * | 12/2011 | Klassen et al. | ................. 358/1.9 |

FOREIGN PATENT DOCUMENTS

| | | |
|---|---|---|
| JP | 2010-108440 | 5/2010 |
| JP | 2011-048812 | 3/2011 |
| JP | 2011-108047 | 6/2011 |

\* cited by examiner

*Primary Examiner* — Barbara Reinier
*Assistant Examiner* — Christopher D Wait
(74) *Attorney, Agent, or Firm* — Harness, Dickey & Pierce, P.L.C.

(57) ABSTRACT

A server device includes an external device information managing unit which manages external device information regarding plural external devices, and an association process flow determining unit which determines an association process flow that defines how plural processes in image processing are performed on image data by the external devices, based on the external device information. The association process flow determining unit is configured to determine plural association process flows for the image processing, and the determined association process flows include first and second association process flows such that first external devices defined in the first association process flow differ from second external devices defined in the second association process flow.

7 Claims, 24 Drawing Sheets

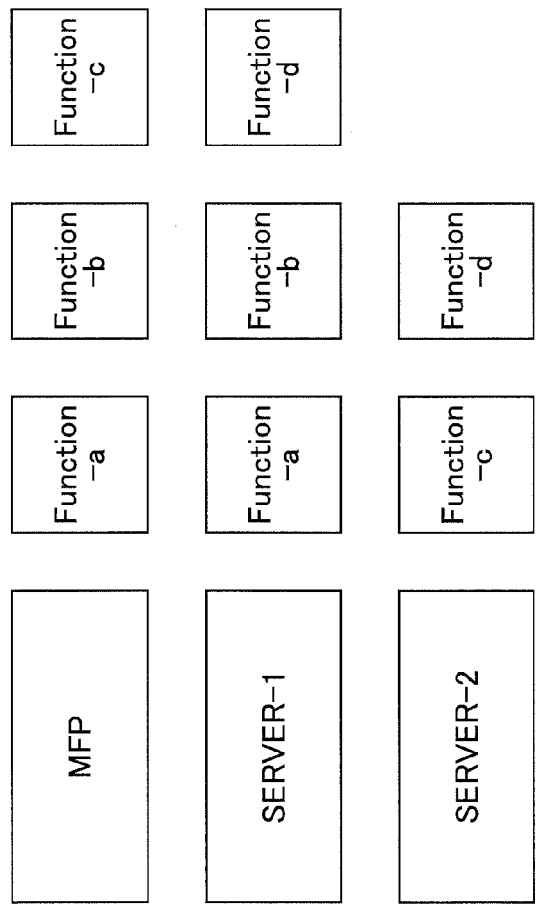

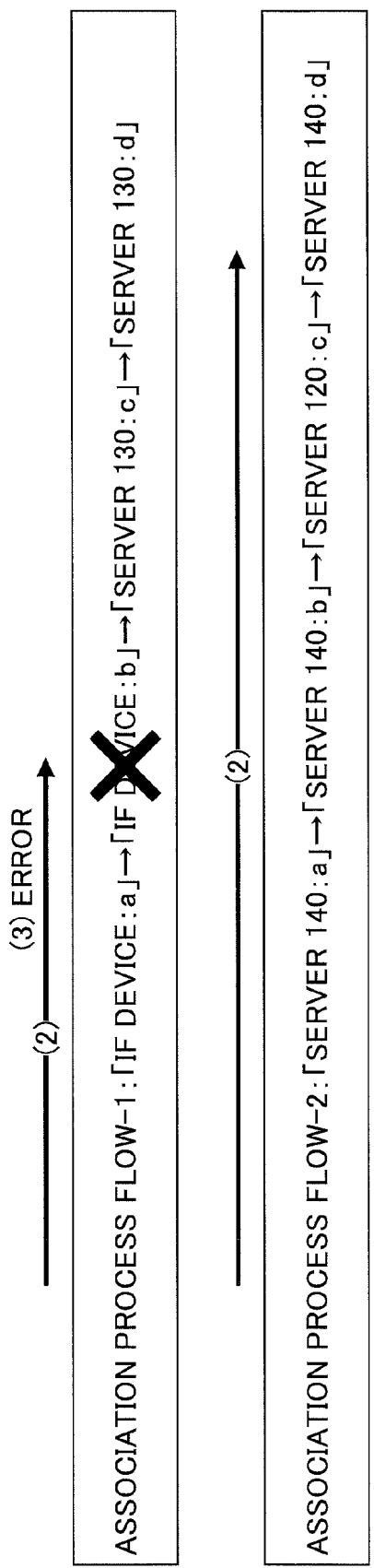

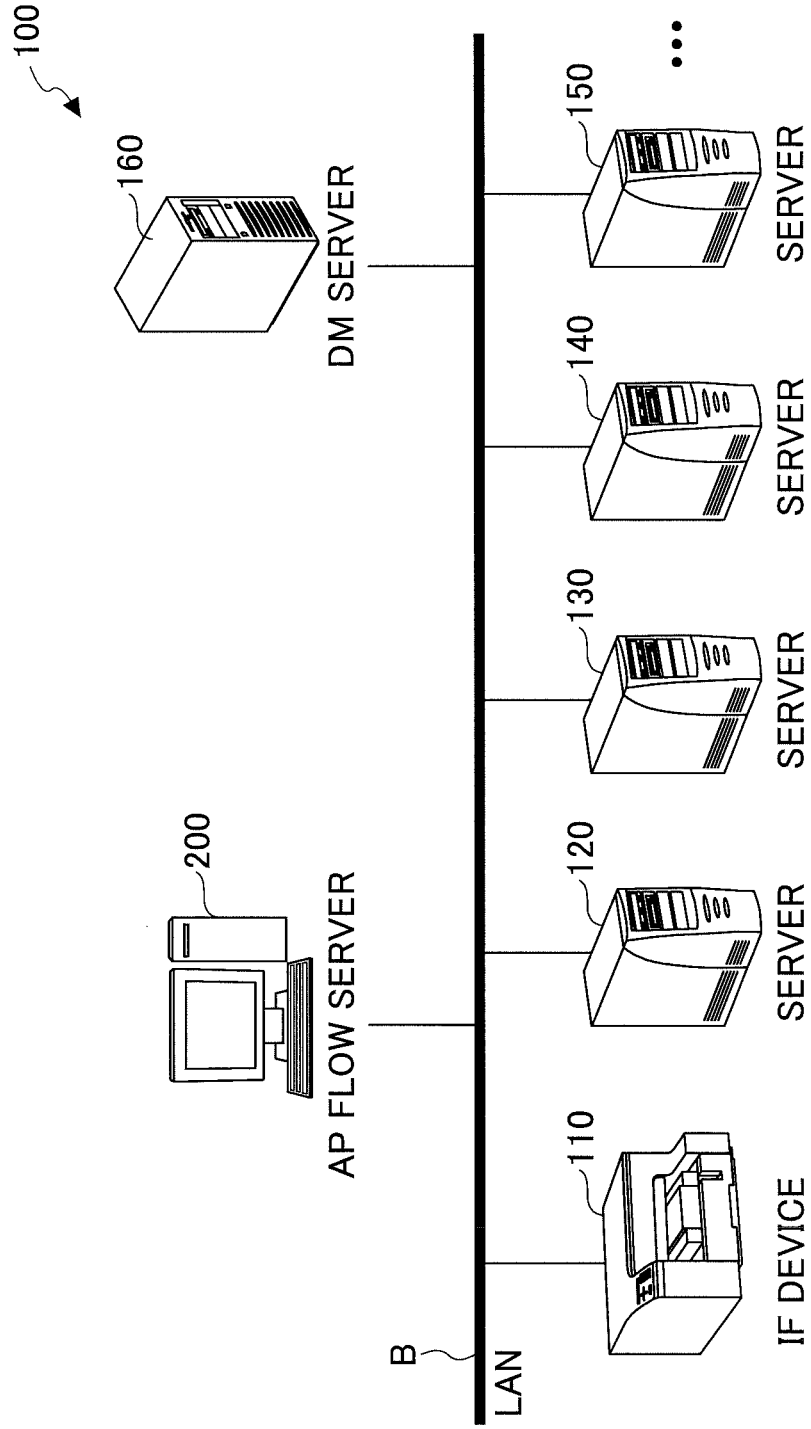

FIG.9

| NO. | IP ADDRESS | SCANNER INFORMATION | | |
|---|---|---|---|---|
| | | RESOLUTION | GRAYSCALE | COLOR OR MONOCHRO |
| 1 | xx. xx. xx. 1 | 200 | 256 | COLOR |
| 2 | xx. xx. xx. 1 | 200 | 512 | COLOR |
| 3 | xx. xx. xx. 1 | 200 | 1024 | COLOR |
| 4 | xx. xx. xx. 1 | 300 | 256 | COLOR |
| 5 | xx. xx. xx. 1 | 300 | 512 | COLOR |
| 6 | xx. xx. xx. 1 | 300 | 1024 | COLOR |
| ... | ... | ... | ... | ... |

| SERVER INFORMATION ||||
|---|---|---|---|
| SERVER ID | FUNCTIONS | LOAD COUNTER | IP ADDRESS |
| 120 | a, b, c | 60 | xx. xx. xx. 11 |
| 130 | c, d | 30 | xx. xx. xx. 22 |
| 140 | a, b, c, d | 60 | xx. xx. xx. 33 |
| 150 | b, c, d, e | 0 | xx. xx. xx. 44 |
| 170 | e | | xx. xx. xx. 55 |
| ⋮ | ⋮ | ⋮ | xx. xx. xx. 66 |
| | | | ⋮ |

FIG.11

| | | | | |
|---|---|---|---|---|
| ASSOCIATION PROCESS FLOW ~95 | | | | |
| NO. | SEQUENCE | FLOW PATTERN | DESTINATION IP ADDRESS | |
| 1 | a→b | (1)<br>110→110 | ●xx. xx. xx. 1<br>■xx. xx. xx. 1 | } 11 |
| | | (2)<br>140→140 | ●xx. xx. xx. 33<br>■xx. xx. xx. 33 | } 12 |
| 2 | a→b→c | (1)<br>110→110→130 | ●xx. xx. xx. 1<br>xx. xx. xx. 1<br>■xx. xx. xx. 22 | |
| | | (2)<br>140→140→120 | ●xx. xx. xx. 33<br>xx. xx. xx. 33<br>■xx. xx. xx. 11 | |
| 3 | a→b→c→d | (1)<br>110→110→130→130 | ●xx. xx. xx. 1<br>xx. xx. xx. 1<br>xx. xx. xx. 22<br>■xx. xx. xx. 22 | } 31 |
| | | (2)<br>140→140→120→140 | ●xx. xx. xx. 33<br>xx. xx. xx. 33<br>xx. xx. xx. 11<br>■xx. xx. xx. 33 | } 32 |
| | | (3)<br>110→120→130→140 | ●xx. xx. xx. 1<br>xx. xx. xx. 11<br>xx. xx. xx. 22<br>■xx. xx. xx. 33 | } 33 |
| 4 | c→d | (1)<br>120→140 | ●xx. xx. xx. 11<br>■xx. xx. xx. 33 | } 41 |
| | | (2)<br>150→150 | ●xx. xx. xx. 44<br>■xx. xx. xx. 44 | } 42 |
| | | (3)<br>130→130 | ●xx. xx. xx. 22<br>■xx. xx. xx. 22 | } 43 |

FIG.12

| DM SERVER INFORMATION ||| _96 |
|---|---|---|
| SERVER ID | IN-USE CAPACITY | IP ADDRESS |
| 160 | 10% | xx. xx. xx. 100 |
| 160A | 50% | xx. xx. xx. 101 |
| 160B | 80% | xx. xx. xx. 102 |
| ⋮ | ⋮ | ⋮ |

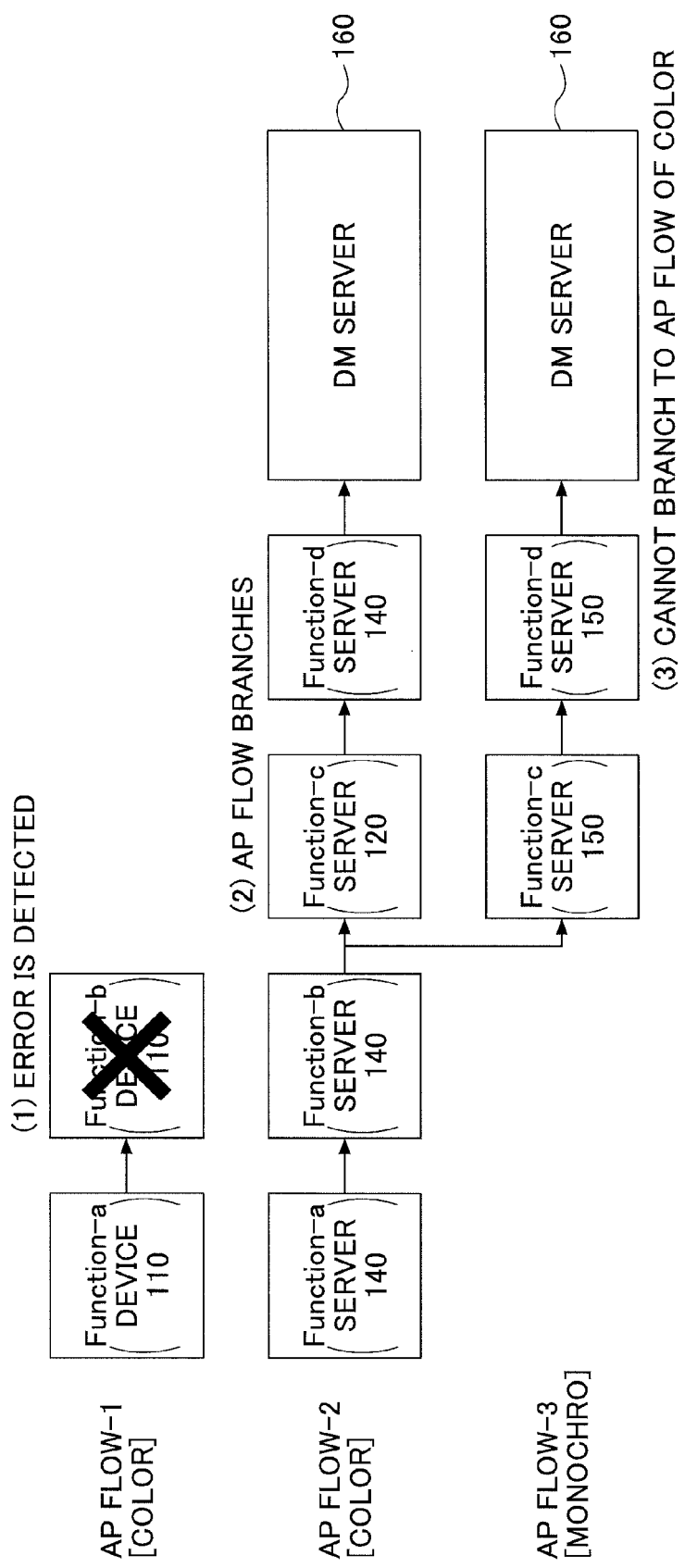

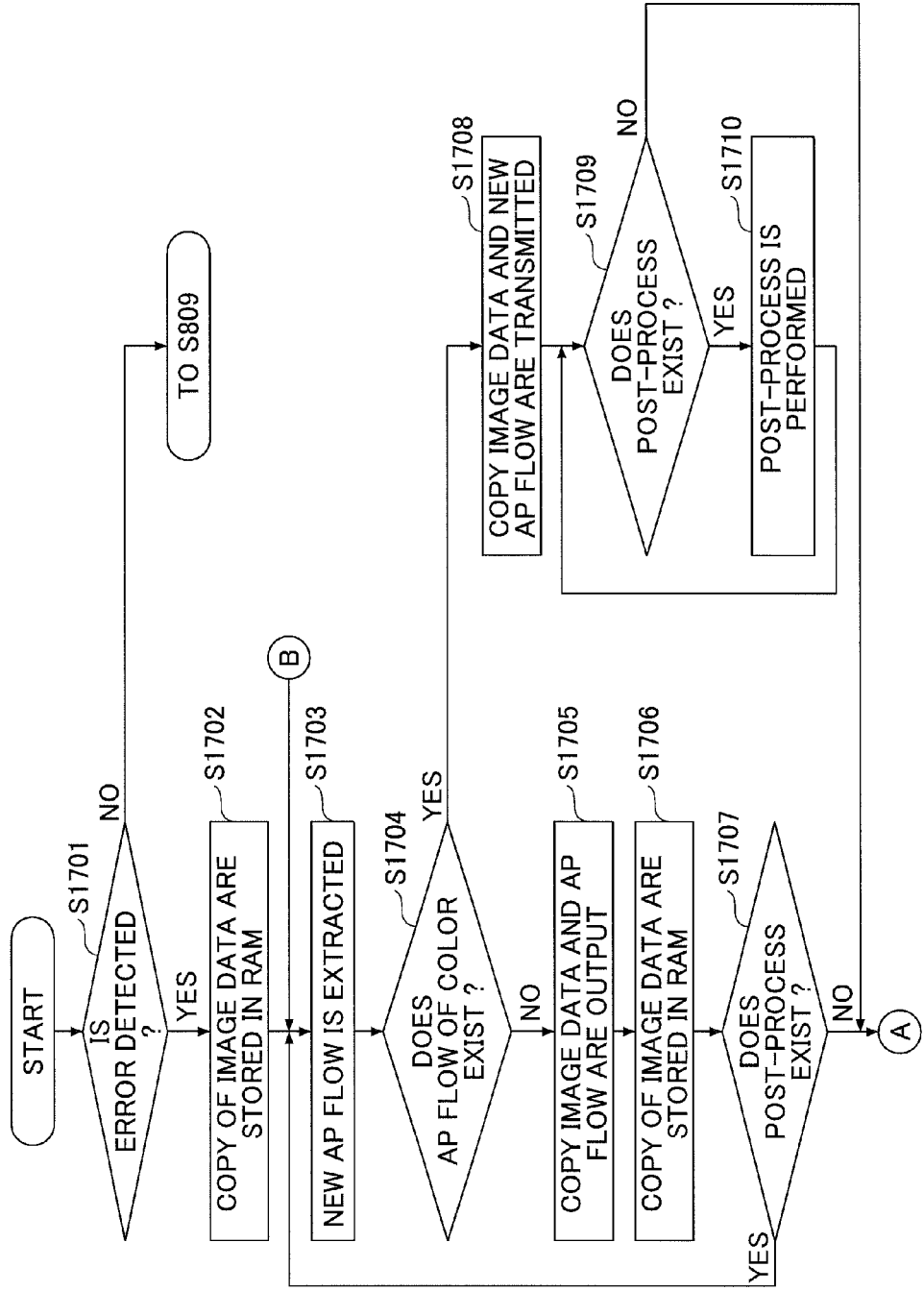

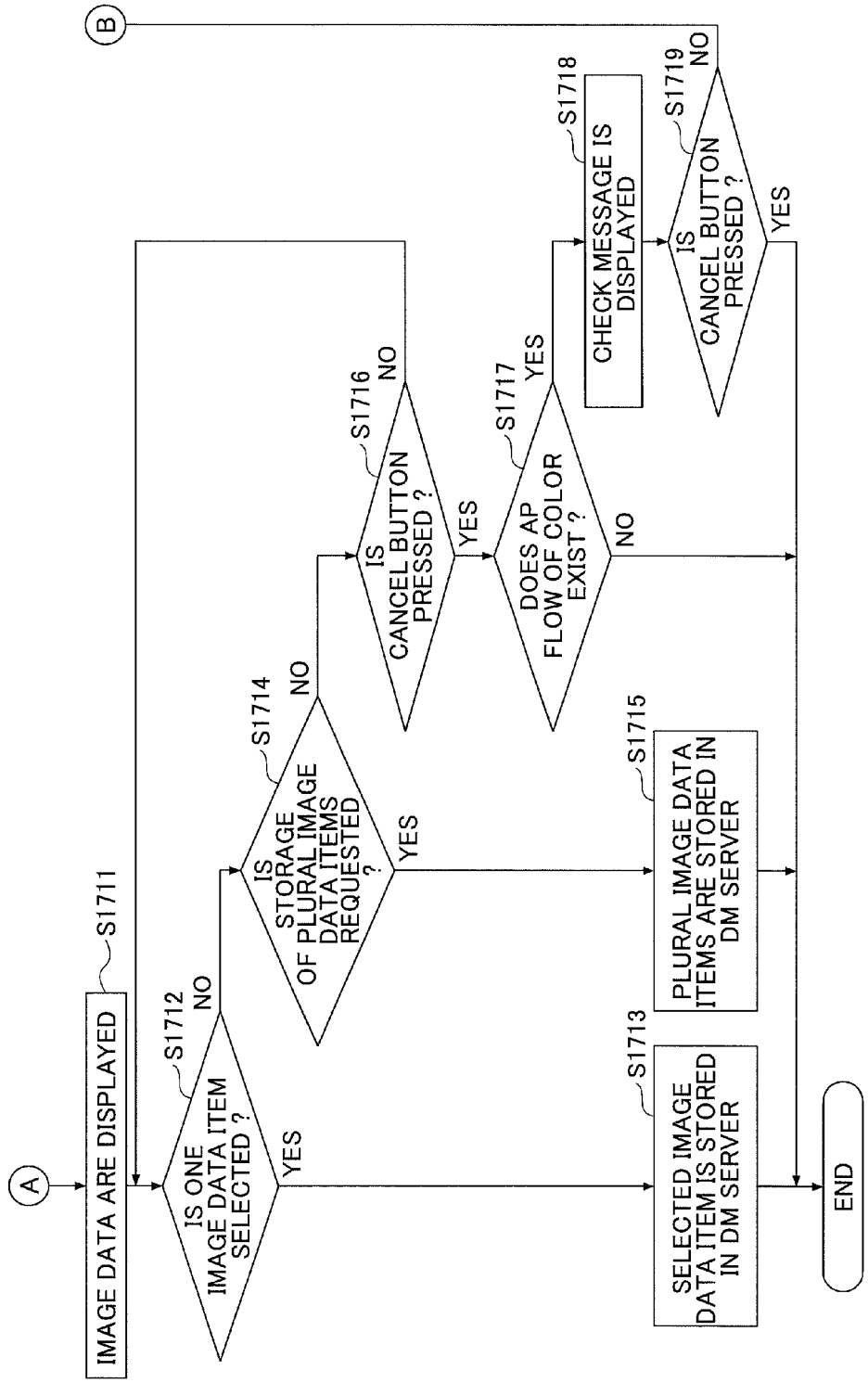

SERVER DEVICE, ASSOCIATION PROCESS FLOW DETERMINING METHOD, AND IMAGE PROCESSING SYSTEM

BACKGROUND OF THE INVENTION

1. Field of the Invention

The present disclosure relates to a server device, an association process flow determining method, and an image processing system which are adapted to manage an association process flow for performing image processing including plural processes on image data by association of plural external devices.

2. Description of the Related Art

In recent years, an image processing system has spread in which plural devices, including servers, personal computers, and multi-function peripherals (MFP) having multiple functions of scanners, facsimile machines, copiers, etc., are associated via a network to perform a series of image processing functions. In this image processing system, an association process flow is used for performing the image processing by association of the servers which share some of the functions included in the image processing and perform the respective processes of the functions corresponding to the servers.

An association process flow according to the related art will be described with reference to FIG. 1A and FIG. 1B. FIG. 1A and FIG. 1B are diagrams for explaining the association process flow according to the related art. FIG. 1A shows the devices which constitute an image processing system for performing the association process flow, and the functions which are to be performed by the devices. FIG. 1B shows the association process flow for performing the image processing.

In the example of FIG. 1A and FIG. 1B, the image processing system includes an image forming device (MFP), a server-1, and a server-2. As shown in FIG. 1A, the image forming device (MFP) is configured to perform Function-a, Function-b, and Function-c. The server-1 is configured to perform Function-a, Function-b, and Function-d. The server-2 is configured to perform Function-c and Function-d.

As shown in FIG. 1B, the association process flow in this case is performed by the image processing system as follows. Image data are input from the image forming device (MFP), the image processing including the processes of Functions-a, -b and -c is performed on the image data, and the resulting image data after the image processing is performed are stored in a document managing (DM) server.

Specifically, in the association process flow of FIG. 1B, the image data after the process of Function-a is performed by the image forming device (MFP) are output to the server-1. The image data after the process of Function-b is performed by the server-1 are output to the server-2. The image data are produced after the process of Function-c is performed by the server-2, and the image data output from the server-2 are stored in the DM server.

In this way, in the association process flow according to the related art, a series of image processing functions is performed by association of the plural devices which constitute the image processing system and share some of the functions included in the image processing.

In the association process flow of FIG. 1B, for example, if execution of the process of Function-b to be performed by the server-1 has failed, the association process flow may be modified so that the image forming device (MFP) is used to perform the processes of Function-a and Function-b and output the resulting image data to the server-2. For example, Japanese Laid-Open Patent Publication No. 2011-108047 discloses such modification method. In the method disclosed in Japanese Laid-Open Patent Publication No. 2011-108047, if a change in the state of the devices, such as a change of the functions to be performed by the servers, takes place, the definition of the association process flow is modified and the association process flow with the modified definition is carried out.

However, in the above association process flow according to the related art, if an error occurs in a server during execution of a process included in the association process flow, the server cannot output the image data to a post-process server which performs a post-process function following the process. In this case, there is a problem in that the user has to wait for recovery of the server or must restart the association process flow from the beginning.

SUMMARY OF THE INVENTION

In one aspect, the present disclosure provides a server device which is able to perform without interruption the image processing by the association process flow even when an error occurs in an external device which is performing an image processing function.

In an embodiment which solves or reduces one or more of the above-mentioned problems, the present disclosure provides a server device for managing an association process flow to perform image processing including plural processes on image data by association of plural external devices, the server device including: an external device information managing unit configured to manage external device information regarding the external devices; and an association process flow determining unit configured to determine an association process flow that defines how the processes in the image processing are performed on image data by the external devices, based on the external device information, wherein the association process flow determining unit is configured to determine plural association process flows for the image processing, and the determined association process flows include at least first and second association process flows such that first external devices defined in the first association process flow differ from second external devices defined in the second association process flow.

Other objects, features and advantages of the present disclosure will become more apparent from the following detailed description when read in conjunction with the accompanying drawings.

BRIEF DESCRIPTION OF THE DRAWINGS

FIG. 1A and FIG. 1B are diagrams for explaining an association process flow according to the related art.

FIG. 2A and FIG. 2B are diagrams for explaining the principle of a first embodiment of the present disclosure.

FIG. 3 is a diagram showing the composition of an image processing system of the first embodiment.

FIG. 9 is a diagram showing an example of scanner information.

FIG. 10 is a diagram showing an example of server information.

FIG. 11 is a diagram showing examples of association process flow patterns of the first embodiment.

FIG. 12 is a diagram showing an example of document managing server information.

FIG. 16A and FIG. 16B are diagrams for explaining cases in which an error in a device which is performing an image processing function is detected in a second embodiment of the present disclosure.

FIG. 17A and FIG. 17B are a flowchart for explaining operations of the image processing system of the second embodiment when an error in the device which is performing the image processing function is detected.

DETAILED DESCRIPTION OF THE PREFERRED EMBODIMENTS

A description will be given of embodiments of the present disclosure with reference to the accompanying drawings.

In a server device of the present disclosure, plural association process flows in which, when performing a series of image processing functions, processes of functions included in the image processing to be performed by different devices are always extracted.

Figure 2A:
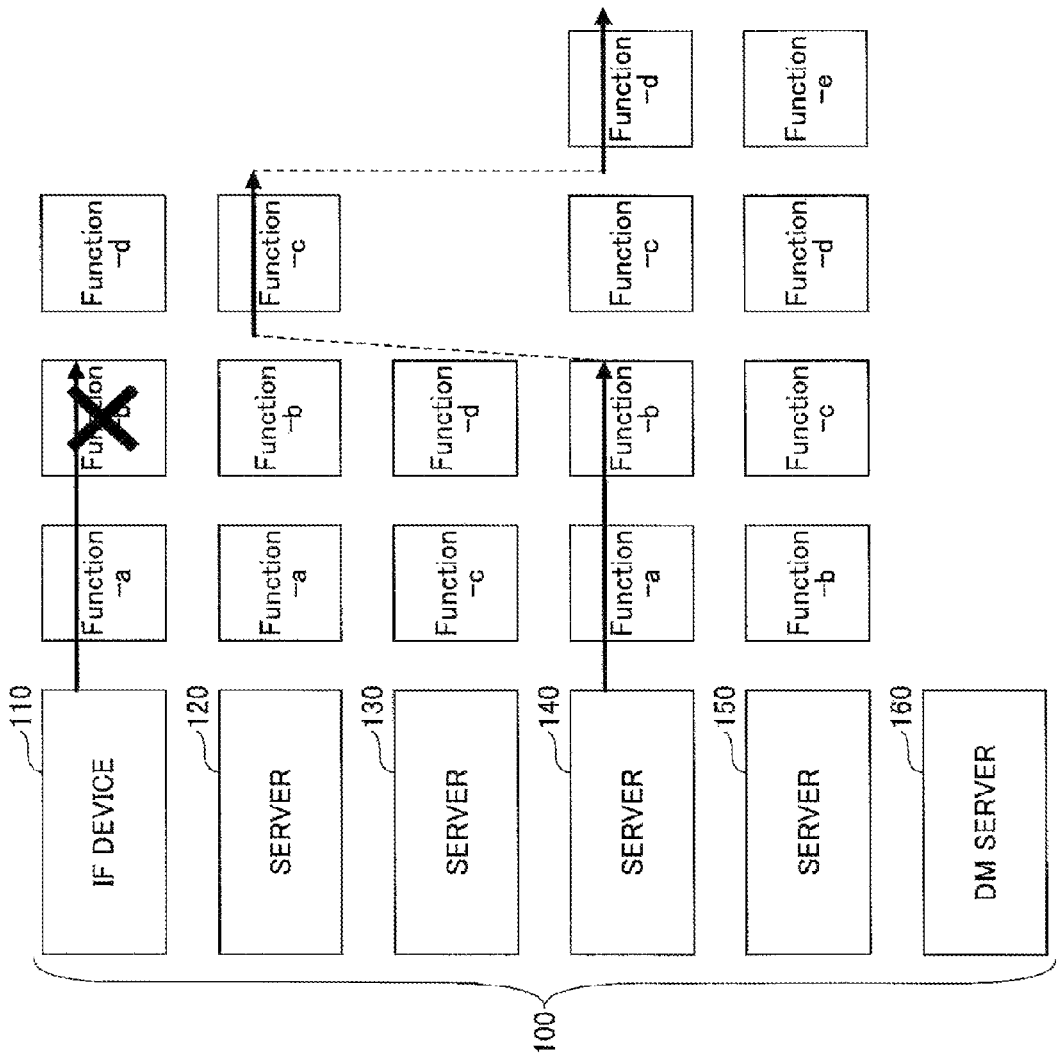

A first embodiment of the present disclosure will be described. FIG. 2A and FIG. 2B are diagrams for explaining the principle of the first embodiment of the present disclosure. FIG. 2A is a diagram showing the functions of the devices that constitute the image processing system, which performs an association process flow. FIG. 2B is a diagram showing the association process flow which performs image processing.

As shown in FIG. 2A, the image processing system 100 of the first embodiment includes an image forming (IF) device 110, servers 120, 130, 140 and 150, and a document managing (DM) server 160. The IF device 110 has Function-a, Function-b, and Function-d. The server 120 has Function-a, Function-b, and Function-c. The server 130 has Function-c and Function-d. The server 140 has Function-a, Function-c, and Function-d. The server 150 has Function-b, Function-c, Function-d, and Function-e. In this embodiment, it is assumed that a series of image processing functions is performed by executing the processes of Function-a, Function-b, Function-c, and Function-d in this order.

In the image processing system 100 of the present embodiment, when performing the image processing, two or more association process flows, as shown in FIG. 2B, are determined for performing the processes of the four Functions described above.

For example, in the association process flow-1, the image forming device 110 and the server 130 are selected as the devices which perform the processes of Functions-a to -d. In the image processing system 100, after the processes of Functions-a and -b are performed by the image forming device 110, the image data are output to the server 130. After the processes of Functions-c and -d are performed on the image data, the server 130 outputs the image data to the document managing server 160.

Furthermore, in the association process flow-2, the servers 120 and 140 are selected as the devices which perform the processes of Functions-a to -d. In the image processing system 100, according to the association process flow-2, the processes of Functions-a and -b are performed by the server 140, the process of Function-c is performed by the server 120, and the process of Function-d is performed by the server 140. Subsequently, the image data are output to the document managing server 160.

In the image processing system 100 of the present embodiment, when performing the association processes according to the association process flow, the association process flow-1 and the association process flow-2 described above are extracted, and the image processing is performed according to the association process flows.

As described above, in the present embodiment, plural association process flows are determined to perform the image processing, so that even when an error occurs in a device which is performing an image processing function, at the time of occurrence of the error, the association process flow can branch to another association process flow. Accordingly, even when an error occurs in the server during execution of the image processing function, the image processing can be performed without interruption by using the plural association process flows.

FIG. 3 shows the composition of the image processing system 100 of the first embodiment. As shown in FIG. 3, the image processing system 100 includes the image forming (IF) device 110, the servers 120, 130, 140 and 150, the document managing (DM) server 160, and an association process (AP) flow managing server 200 interconnected by a LAN (local area network) cable B or the like.

The image forming device 110 in the present embodiment is, for example, a scanner device which generates image data by reading an image from a document. The image forming device 110 in the present embodiment not only develops the image data into bit-mapped image data, but also transmits the scanner information (a resolution value, a grayscale value, a reading mode, etc.) regarding the scanner device to the AP flow managing server 200.

The image forming device 110 in the present embodiment outputs the read image data to any of the servers 120-150 based on the association process flow determined by the AP flow managing server 200. In the present embodiment, the image forming device 110 is the scanner device. Alternatively, the image forming device 110 may be a multi-function peripheral (MFP) which has a scanner function of reading image data.

The servers 120-150 in the present embodiment are servers which perform the association process flow in an associated manner. Each of the servers 120-150 determines the sequence of execution of the function (or the process of the function) to be performed by the server itself based on the association process flow determined by the AP flow managing server 200, and performs the process of the function according to the sequence. Then, each of the servers 120-150 outputs the image data to a post-process server or the document managing server 160.

The image data after the final process in the association process flow is performed are stored in the document managing server 160 in the present embodiment. In the present embodiment, the image data are stored in the document managing server 160. Alternatively, the image data may be stored in an information display terminal, such as a smart phone.

The association process (AP) flow managing server 200 of the present embodiment manages the states of the image forming device 110 and the servers 120-150 which constitute the image processing system 100. The AP flow managing server 200 of the present embodiment determines the association process flow which is to be performed by the image processing system 100. The details of the AP flow managing server 200 of the present embodiment will be described later.

Figure 4:
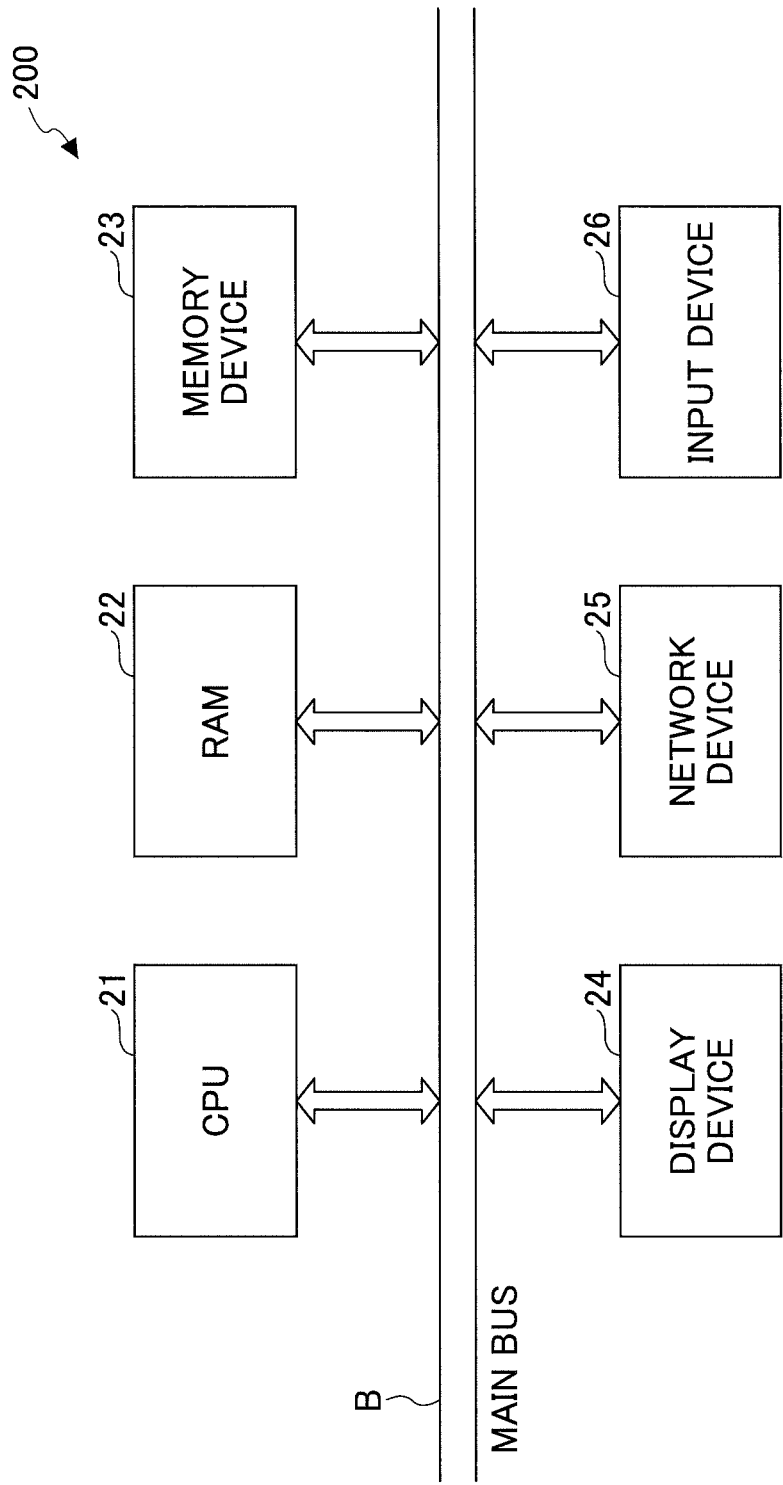
FIG. 4 is a block diagram showing the hardware composition of an AP flow managing server in the image processing system of the first embodiment.

FIG. 4 shows the hardware composition of the AP flow managing server 200 in the present embodiment. As shown in FIG. 4, the AP flow managing server 200 includes a CPU (central processing unit) 21, a RAM (random access memory) 22, a memory device 23, a display device 24, a network device 25, and an input device 26. These devices of the AP flow managing server 200 are interconnected by a main bus B.

The CPU 21 controls the RAM 22, the memory device 23, the display device 24, the network device 25, and the input device 26 via the main bus B. The RAM 22 provides a work area for the CPU 21. The memory device 23 may include a HDD (hard disk drive) and an NVRAM (non-volatile random access memory), and stores various kinds of programs and setting information therein. The input device 26 is provided for a user to input a command or other information to the AP flow managing server 200. The display device 24 is provided for displaying a screen or other information to a user. The network device 25 provides an interface for communications between the AP flow managing server 200 and another device connected to the AP flow managing server 200 via a LAN (local area network).

The hardware composition of the document managing server 160 in the image processing system of the present embodiment is essentially the same as that of the AP flow managing server 200, and a description thereof will be omitted.

Figure 5:
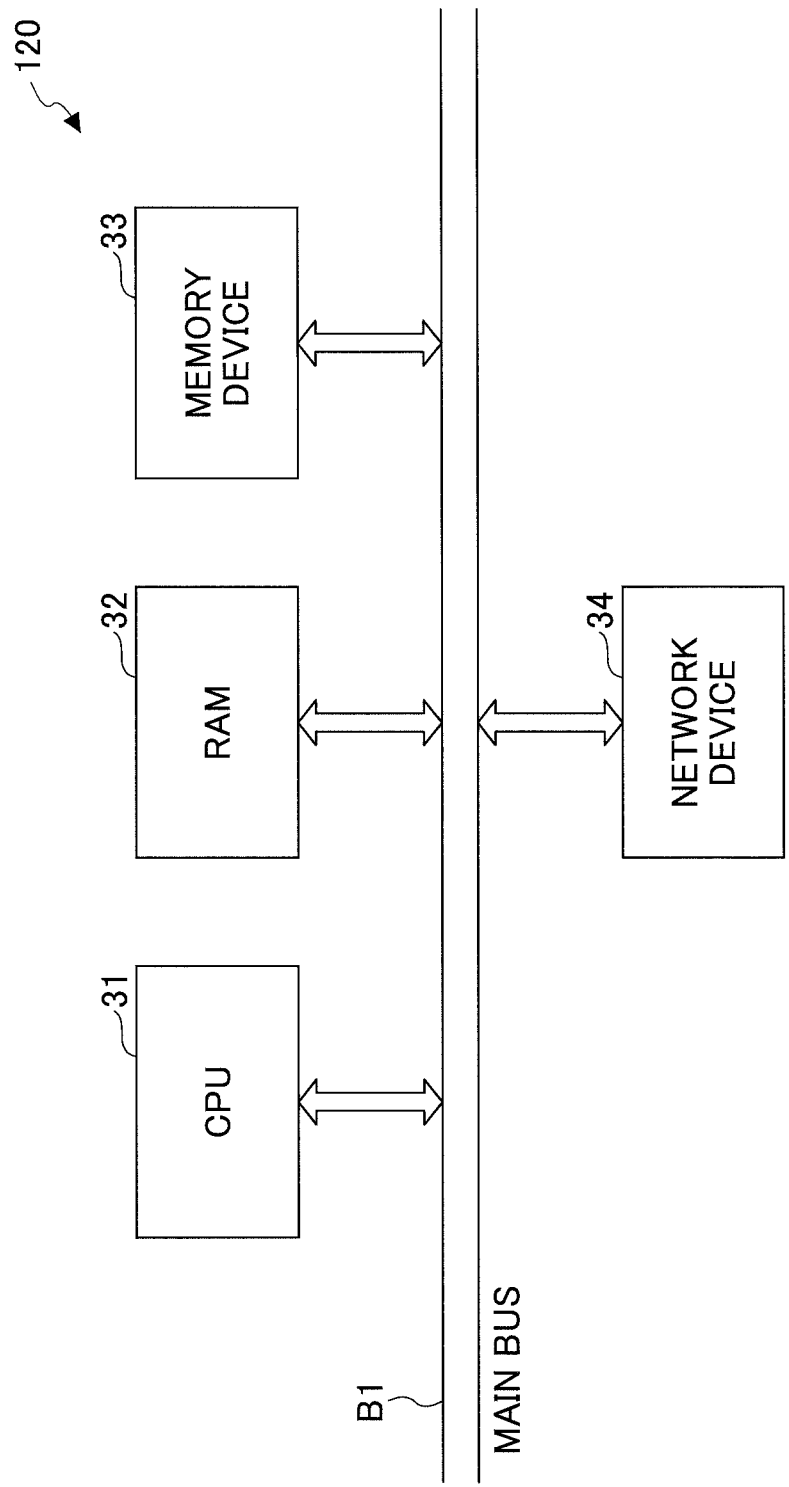
FIG. 5 is a block diagram showing the hardware composition of a server in the image processing system of the first embodiment.

FIG. 5 shows the hardware composition of a server in the image processing system of the present embodiment. The servers 120-150 in the image processing system 100 of the present embodiment have the same hardware composition. Hence, FIG. 5 shows the hardware composition of the server 120 only as a typical example of the servers 120-150.

As shown in FIG. 5, the server 120 in the present embodiment includes a CPU 31, a RAM 32, a memory device 33 and a network device 34 are interconnected by a main bus B1. The CPU 31 controls the RAM 32, the memory device 33 and the network device 34 via the main bus B1. The RAM 32 provides a work area for the CPU 31. The memory device 33 stores various kinds of programs and setting information therein. The network device 34 provides an interface for communications between the server 120 and another device connected to the server 120 via a LAN.

Figure 6:
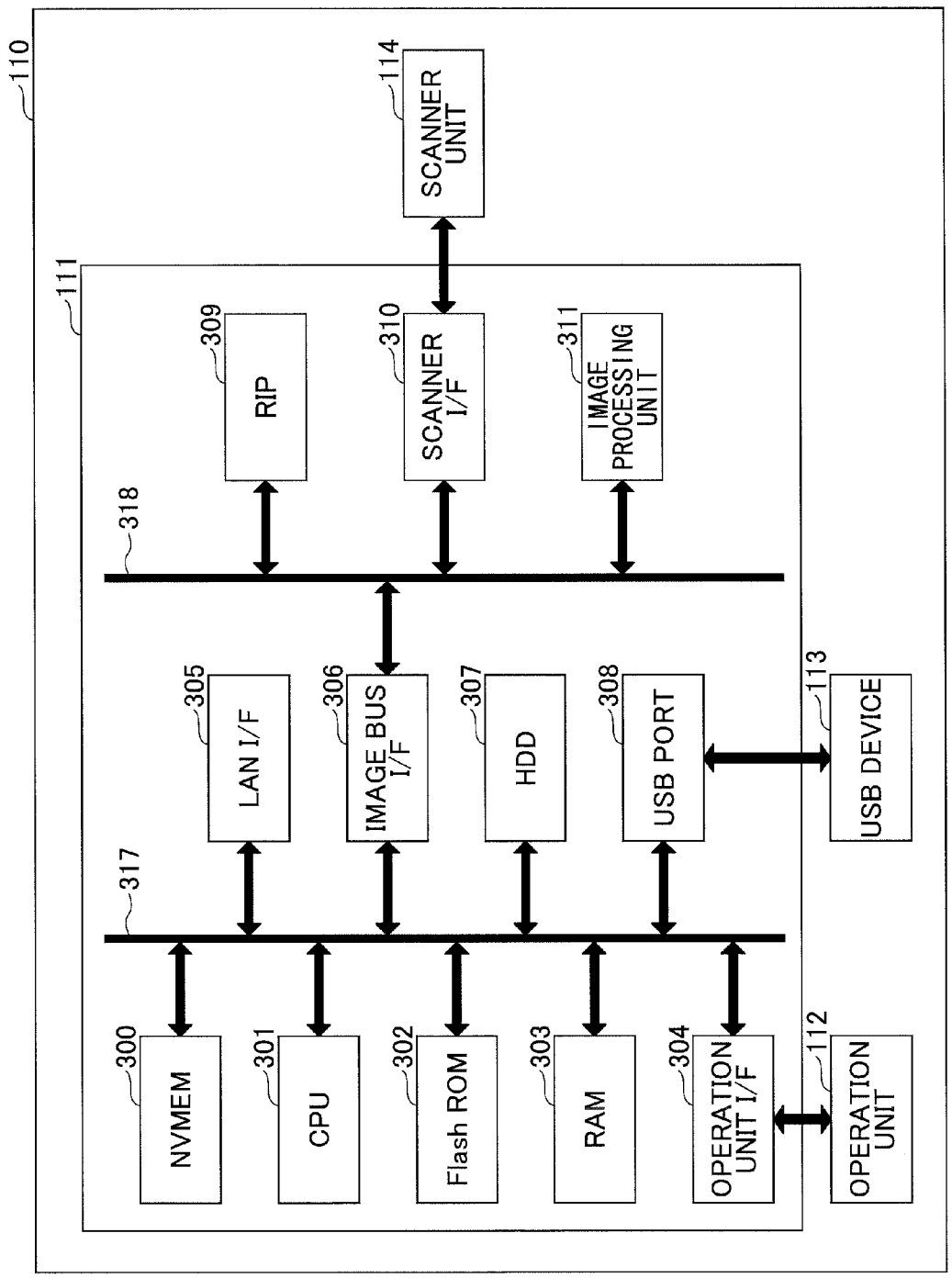
FIG. 6 is a diagram showing the hardware composition of an image forming device in the image processing system of the first embodiment.

FIG. 6 shows the hardware composition of the image forming (IF) device 110 in the image processing system of the present embodiment. As shown in FIG. 6, the image forming device 110 includes a controller unit 111, an operation unit 112, a USB (universal serial bus) device 113, and a scanner unit 114.

The controller unit 111 includes an NVMEM (non-volatile memory) 300, a CPU (central processing unit) 301, a flash ROM (read only memory) 302, a RAM (random access memory) 303, an operation unit I/F (interface) 304, a LAN I/F 305, an image bus I/F 306, a HDD (hard disk drive) 307, and a USB port 308. These components of the controller unit 111 are interconnected by a system bus 317.

The controller unit 111 further includes an RIP (raster image processor) 309, a scanner I/F 310, and an image processing unit 311. These components of the controller unit 111 are interconnected by an image bus 318. The image bus 318 is connected to the image bus I/F 306.

The CPU 301 is a processor which controls the whole image forming device 110. The NVMEM 300 is a nonvolatile memory which stores setup information or the like therein. For example, the NVMEM 300 may function as any of a system work memory for the CPU 301, a program memory for storing a program therein, and an image memory for temporarily storing image data therein. The flash ROM 302 is a rewritable non-volatile memory which stores various control programs for controlling the system. The USB port 308 enables connection of the image forming device 110 with the USB device 113 attached to the USB port 308. The operation unit I/F 304 provides an interface between the controller unit 110 and the operation unit 112. The operation unit I/F 304 transmits information, input from the operation unit 112, to the CPU 301, and outputs image data, such as an operational screen, to be displayed on the operation unit 112, to the operation unit 112.

The operation unit 112 may include an LCD (liquid crystal display) for displaying an operational screen of the system, operation keys, etc. For example, a touch-panel sheet may be attached to the LCD display screen. The operation unit 112 transmits input information when any of the operation keys is pressed by a user or position information when the touch-panel sheet is pressed by a user to the CPU 301 via the operation unit I/F 304.

The LAN I/F 305 provides an interface for connection of the image forming device 110 with a not-shown LAN. The image forming device 110 may receive data from or transmit data to another device (a PC or a server) in the LAN via the LAN I/F 305.

The image bus I/F 308 may include a bus bridge which connects the system bus 317 and the image bus 318 together and provides a data structure conversion capability. The image bus 318 may include a PCI (peripheral component interconnect) bus and an IEEE (Institute of Electrical and Electronic Engineers) 1394 bus. With the image bus 318, image data can be transmitted at high speed.

The RIP 309 processes vector data, such as PDL (page description language) codes, into bitmapped image data. The scanner I/F 310 provides an interface for connecting the controller unit 111 and the scanner unit 114 (which functions as an image reading unit), and provides an image data conversion capability.

The scanner unit 114 generates image data by reading an image from a document. For example, a laser-implemented image-reading method may be used for the scanner unit 114 in the present embodiment. The controller unit 111 performs inputting of image data from the scanner unit 114 or outputting of device information to the scanner unit 114 via the scanner I/F 310.

The image processing unit 311 performs image processing, such as compensation, enhancement or editing, on the input image data. For example, the image processing unit 311 in the present embodiment may perform compensation, resolution conversion, etc., on the image data generated by the scanner unit 114. The image processing unit 311 in the present embodiment may perform a rotation process on the input image data. Moreover, the image processing unit 311 in the present embodiment may perform the compression/decompression process of JPEG (Joint Photographic Experts Group) or the like if the input image data are multi-level image data and may perform the compression/decompression process of JBIG (Joint Bi-level Image Experts Group), MMR (Modified Modified READ), MH (Modified Huffman), etc., if the input image data are binary image data.

Figure 7:
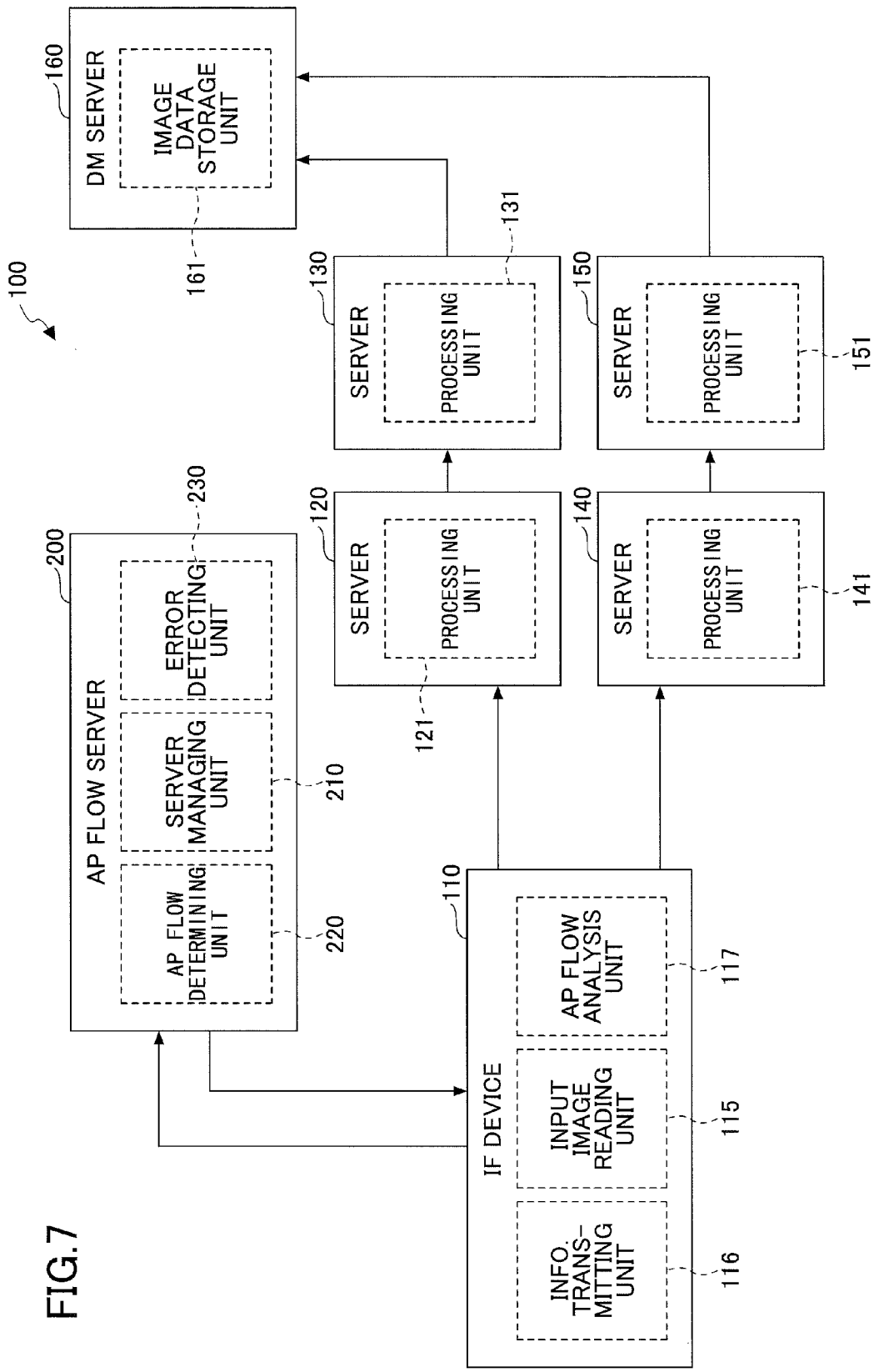
FIG. 7 is a diagram showing the functional composition of respective devices in the image processing system of the first embodiment.

Next, the functional composition of the image processing system 100 of the present embodiment will be described with reference to FIG. 7. FIG. 7 shows the functional composition of the respective devices in the image processing system of the first embodiment.

As shown in FIG. 7, the image forming (IF) device 110 in the present embodiment includes an input image reading unit 115, an information transmitting unit 116, and an AP (association process) flow analysis unit 117.

The input image reading unit 115 in the present embodiment develops the image data read by the scanner unit 114 into bit-mapped image data, and temporarily stores the bit-mapped image data in the NVMEM 300. The information transmitting unit 116 transmits scanner information of the image forming device 110 to the AP flow managing server 200. The details of the scanner information will be described later. The information transmitting unit 116 transmits the image data and the association process flow to a server which performs a first association process in the association process flow received from the AP flow managing server 200.

The AP flow analysis unit 117 analyzes the association process flow received from the AP flow managing server 200.

As shown in FIG. 7, the AP flow managing server 200 in the present embodiment includes a server managing unit 210, an AP (association process) flow determining unit 220, and an error detecting unit 230.

The server managing unit 210 in the present embodiment manages server information regarding the servers 120-150. Specifically, the server information may include the names or IDs of the servers 120-150, the IP addresses of the servers 120-150, the information indicating the functions executable by each server, the information indicating the states of the loads on the servers 120-150, etc. The server information in the present embodiment may be stored in, for example, the memory device 23 of the AP flow managing server 200.

The server managing unit 210 in the present embodiment may update the server information stored in the memory device 23 when a change in the states of the servers 120-150 takes place. Alternatively, the server managing unit 210 in the present embodiment may receive the states of the servers 120-150 at intervals of a predetermined time period so that the server information stored in the memory device 23 is updated accordingly.

The server managing unit 210 of the present embodiment may manage the document managing (DM) server information indicating the state of the document managing (DM) server 160, in addition to the server information of the servers 120-150. For example, the DM server information may include information indicating an available space of the document managing server 160 and such DM server information may be stored in the memory device 23. The details of the document managing server information will be described later.

The AP flow determining unit 220 in the present embodiment determines an association process flow which defines how the processes in the image processing are performed on the image data by the servers 120-150 and the IF device 110, based on the scanner information received from the image forming device 110 and the server information of each of the servers 120-150 managed by the server managing unit 210.

Specifically, the AP flow determining unit 220 in the present embodiment extracts an appropriate association process flow from among the patterns of the association process flows (which are hereinafter called association process flow patterns) which are prepared and stored beforehand, based on the scanner information and the server information.

The association process flow patterns may be stored beforehand in the memory device 23 of the AP flow managing server 200. For example, each of the association process flow patterns in the present embodiment may include the sequence of execution, the servers which perform the processes in the image processing, a destination IP address, flag information indicating a server which performs a first process in the image processing, and flag information indicating a server which performs a final process in the image processing. The details of the association process flow patterns will be described later.

The image processing performed on the image data in the present embodiment may include the processes of the functions performed by the servers 120-150, respectively. For example, the functions performed by the servers 120-150 may include editing (including expansion and reduction of image data), scanner compensation, color space conversion processing, plotter processing, etc.

The error detecting unit 230 in the present embodiment detects an error which occurs in a device during execution of the association process flow. Specifically, when no response is received from a server (which is performing the process of the function included in the image processing) for a predetermined time, the error detecting unit 230 detects that an error in the server has occurred.

Each of the servers 120-150 in the present embodiment has a processing unit which performs the processes of predetermined functions in the server itself. The server 120 includes a processing unit 121, the server 130 includes a processing unit 131, the server 140 includes a processing unit 141, and the server 150 includes a processing unit 151.

The document managing server 160 includes an image-data storage unit 161 which stores image data therein. For example, in the present embodiment, the image data which are produced after the association process flow is completed are stored in the image-data storage unit 161.

Next, with reference to FIG. 8, the determination of the association process flows by the image processing system 100 of the present embodiment will be described.

Figure 8:
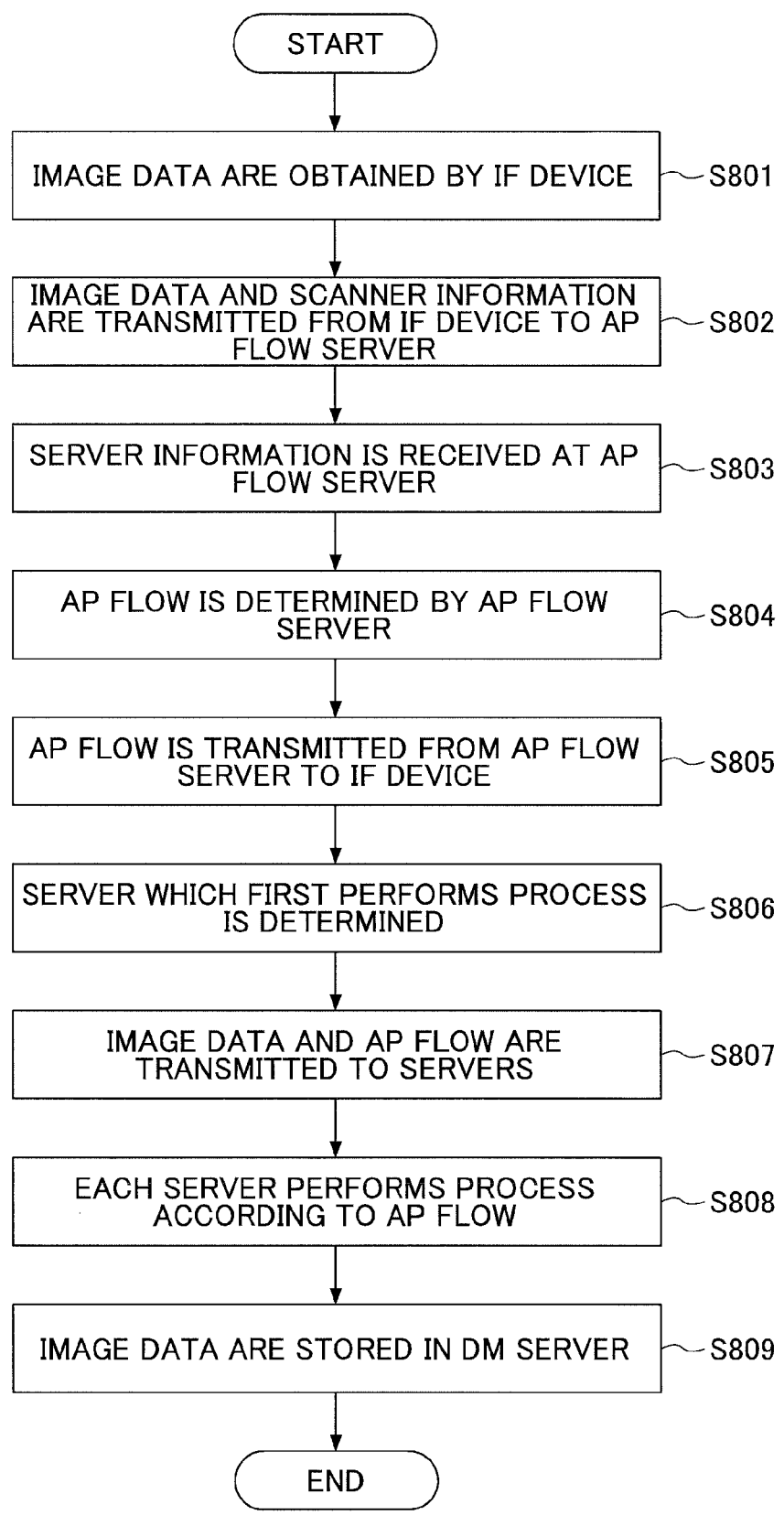
FIG. 8 is a flowchart for explaining a method of determining an association process flow by the image processing system of the first embodiment.

FIG. 8 is a flowchart for explaining a method of determining association process flows in the first embodiment. In the image processing system 100 of the present embodiment, the image forming device 110 controls the input image reading unit 115 to receive the image data read out by the scanner unit 114 (step S801). Then, the image forming device 110 controls the information transmitting unit 116 to transmit the scanner information to the AP flow managing server 200 (step S802).

The scanner information will be described with reference to FIG. 9. FIG. 9 shows an example of the scanner information. As shown in FIG. 9, each item of the scanner information 90 may include an IP address of the corresponding image forming device 110, a resolution value, a grayscale value, information indicating availability of a color printing function, etc. In the present embodiment, the image processing system 100 may be arranged so that the scanner information 90 is accessed and it is determined whether association process flows appropriate for color are extracted or association process flows appropriate for monochrome are extracted.

Referring back to FIG. 8, the AP flow managing server 200 controls the server managing unit 210 to receive the server information (step S803).

The server information in the present embodiment will be described. FIG. 10 shows an example of the server information. As shown in FIG. 10, each item of the server information 91 may include a server ID, functions which can be performed by the corresponding server, a load counter indicating the state of a load of the server, and an IP address of the server. For example, according to the server information 91, the functions which can be performed by the server 120 are Function-a, Function-b, and Function-c, and the value of the load counter of the server 120 is 60. Moreover, the functions which can be performed by the server 130 are Function-c and Function-d, and the value of the load counter of the server 130 is 30.

Hence, it may be observed that the load of the server 130 is smaller than the load of the server 120. The load counter may indicate the state of the load of a server. Alternatively, the load counter may indicate the CPU activity ratio of a server.

Subsequently, as shown in FIG. 8, the AP flow managing server 200 controls the AP flow determining unit 220 to determine association process flows (step S804).

The determination of the association process flows by the AP flow determining unit 220 of the present embodiment will be described in greater detail. The AP flow determining unit 220 of the present embodiment extracts plural association process flows for performing a series of image processing functions on the image data after the image data of the image forming device 110 are received and before the image data are stored in the document managing server 160.

In the following, it is assumed that a series of image processing functions is performed by executing the processes of Function-a, Function-b, Function-c, and Function-d in this order, and a case in which two association process flows are extracted will be described.

The AP flow determining unit 220 of the present embodiment accesses the association process flow patterns and the server information 91 and extracts a first association process flow. Next, the AP flow determining unit 220 extracts a second association process flow for performing the image processing by the servers which are not used in the first association process flow.

FIG. 11 shows examples of the association process flow patterns of the first embodiment. As shown in FIG. 11, each item of the association process flow patterns 95 may include the sequence of execution, the flow pattern in which the IDs of the servers to perform the processes are sequentially described as a list, the destination IP address of a device to which the image data after the image processing is performed are transmitted, the flag information indicating a first-process server which performs a first process in the image processing, and the flag information indicating a final-process server which performs a final process in the image processing. In FIG. 11, the server having the destination IP address to which ● is prefixed is the first-process server which performs the first process, and the server having the destination IP address to which ■ is prefixed is the final-process server which performs the final process.

Specifically, as shown in FIG. 11, in the association process flow pattern No. 1, the sequence of execution indicates that the process of Function-a and the process of Function-b are executed in this order. The flow pattern includes: a first pattern (pattern 11) in which the process of Function-a and the process of Function-b are performed by the image forming device 110; and a second pattern (pattern 12) in which the process of Function-a and the process of Function-b are performed by the server 140.

Moreover, in the association process flow pattern No. 3, the sequence of execution indicates that the process of Function-a, the process of Function-b, the process of Function-c, and the process of Function-d are executed in this order. The flow pattern includes: a first pattern (the pattern 31) in which the processes of Function-a and Function-b are performed by the image forming device 110 and the processes of Function-c and Function-d are performed by the server 130; a second pattern (the pattern 32) in which the processes of Function-a, Function-b, and Function-d are performed by the server 140 and the process of Function-c is performed by the server 120; and a third pattern (the pattern 33) in which the process of Function-a is performed by the image forming device 110, the process of Function-b is performed by the server 120, the process of Function-c is performed by the server 130, and the processing of Function-d is performed by the server 140.

For example, when extracting the association process flows for performing the processes of Function-a, Function-b, Function-c, and Function-d in this order, the AP flow determining unit 220 accesses the association process flow patterns 95 and extracts flow patterns from those of the association process flow pattern No. 3.

Next, the case in which flow patterns are extracted from among the flow patterns of the association process flow pattern No. 3 will be described below. The AP flow determining unit 220 in the present embodiment accesses the server information 91 and extracts a flow pattern which is related to a server with the load counter indicating a small load value as a first association process flow-1. Subsequently, the AP flow determining unit 220 extracts an association process flow pattern related to a server which is not used in the first association process flow-1 as a second association process flow-2.

In the present embodiment, as shown in FIG. 2B, the pattern 31 may be extracted as the first association process flow-1 and the pattern 32 may be extracted as the second association process flow-2.

According to the image processing system of the present embodiment, two or more association process flows are extracted, and even when an error in a device which is performing an image processing function is detected during execution of the series of image processing functions, the image processing can be continuously performed by using another association process flow.

In the present embodiment, the AP flow determining unit 220 extracts the two association process flows. However, the present disclosure is not limited to the present embodiment. Alternatively, the AP flow determining unit 220 may extract three or more association process flows.

Referring back to FIG. 8, after the AP flow determining unit 220 extracts the association process flows, the AP flow managing server 200 transmits the extracted association process flows to the image forming device 110 (step S805). At this time, the association process flow managing server 200 transmits the plural association process flows extracted by the AP flow determining unit 220 to the image forming device 110.

The image forming device 110 causes the AP flow analysis unit 117 to analyze the plural association process flows received from the AP flow managing server 200 (step S806). Moreover, the image forming device 110 specifies the device or the server which is to perform the first process among the processes included in the image processing for each association process flow (step S806).

Subsequently, if the first-process device specified at the step S806 differs from the image forming device 110, the image forming device 110 causes the information transmitting unit 116 to transmit the image data and the association process flows to the specified device (step S807).

Specifically, in the case of the association process flow-1 in the example of FIG. 2B, the image forming device 110 is the first-process device which performs the first process among the processes included in the image processing of the association process flow-1. In this case, the image forming device 110 does not perform transmission of the image data and the association process flows at the step S807.

On the other hand, in the case of the association process flow-2, the server 140 is specified as being the first-process device which is to perform the first process among the processes included in the image processing of the association process flow-2. In this case, the image forming device 110 transmits the image data and the association process flows to the server 140 at the step S807.

Each device which has received the image data and the association process flows performs the process of the relevant function according to the relevant association process flow (step S808). Specifically, the image processing system 100 of the present embodiment carries out the image processing for each of the association process flow-1 and the association process flow-2 in parallel. In the preferred embodiment, the image processing system 100 may perform the association process flow-1 and the association process flow-2 simultaneously.

Subsequently, the device which has performed the final process among the processes included in the image processing of the relevant association process flow transmits the resulting image data to the document managing server 160 and stores the same in the document managing server 160 (step S809). Then, the determination of the association process flows by the image processing system 100 of the present embodiment is terminated.

In the foregoing embodiment, the association process flow-1 and the association process flow-2 are carried out in parallel, and the image data are generated as a result of the image processing performed according to the association process flow-1, and the image data are generated as a result of the image processing performed according to the association process flow-2. These image data are the same image data. In the preferred embodiment, the image processing system 100 may be arranged so that only the image data generated by the image processing according to the association process flow-1 are stored in the document managing server 160, and the image data generated by the image processing according to the association process flow-2 may be canceled or discarded. Alternatively, a user may be prompted to select the image data to be stored in the document managing server 160 from among the plural image data items.

In the foregoing embodiment, the image data are stored in the document managing server 160. Alternatively, another document managing server may be arranged in the image processing system 100 to store the image data therein. Alternatively, the AP flow determining unit 220 may access the document managing server information and determine beforehand the document managing server for storing image data.

FIG. 12 shows an example of the document managing server information. As shown in FIG. 12, in the document managing server information 96, respective in-use capacities of plural document managing servers are indicated. In the example of FIG. 12, the in-use capacity of the document managing server 160 is the minimum among those of the document managing servers. Hence, by accessing the document managing server information 96, the AP flow determining unit 220 can select the document managing server 160 as the location of storing the image data.

Next, a case in which an error in a device which is performing a process is detected during execution of the association process flow in the image processing system 100 of the first embodiment will be described.

Figure 13:
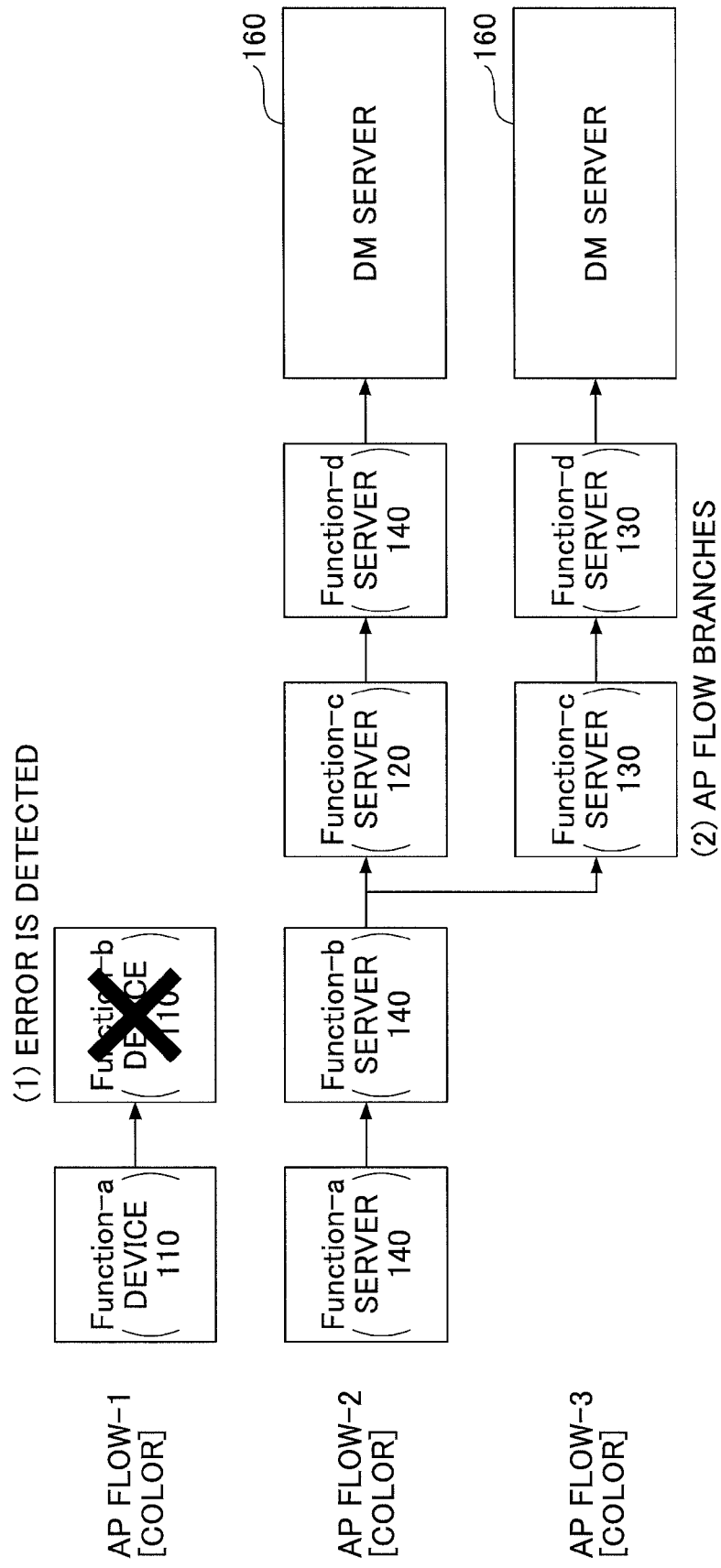
FIG. 13 is a diagram explaining a case where an error is detected in a device which is performing an image processing function in the first embodiment.

FIG. 13 is a diagram for explaining the case where an error in the device which is performing the process is detected in the image processing system 100 of the first embodiment. Specifically, in the example of FIG. 13, it is assumed that an error in the device which is performing the process of Function-b in the association process flow-1 is detected.

As shown in FIG. 13, when the error is detected by the error detecting unit 230 during execution of the process of Function-b according to the association process flow-1, the AP flow managing server 200 cancels execution of the association process flow procedure following the process of Function-b in the association process flow-1, and maintains execution of the association process flow-2 procedure. Moreover, the association process flow managing server 200 causes the AP flow determining unit 220 to extract a new association process flow-3 which performs the subsequent processes after the process of Function-b.

Figure 14:
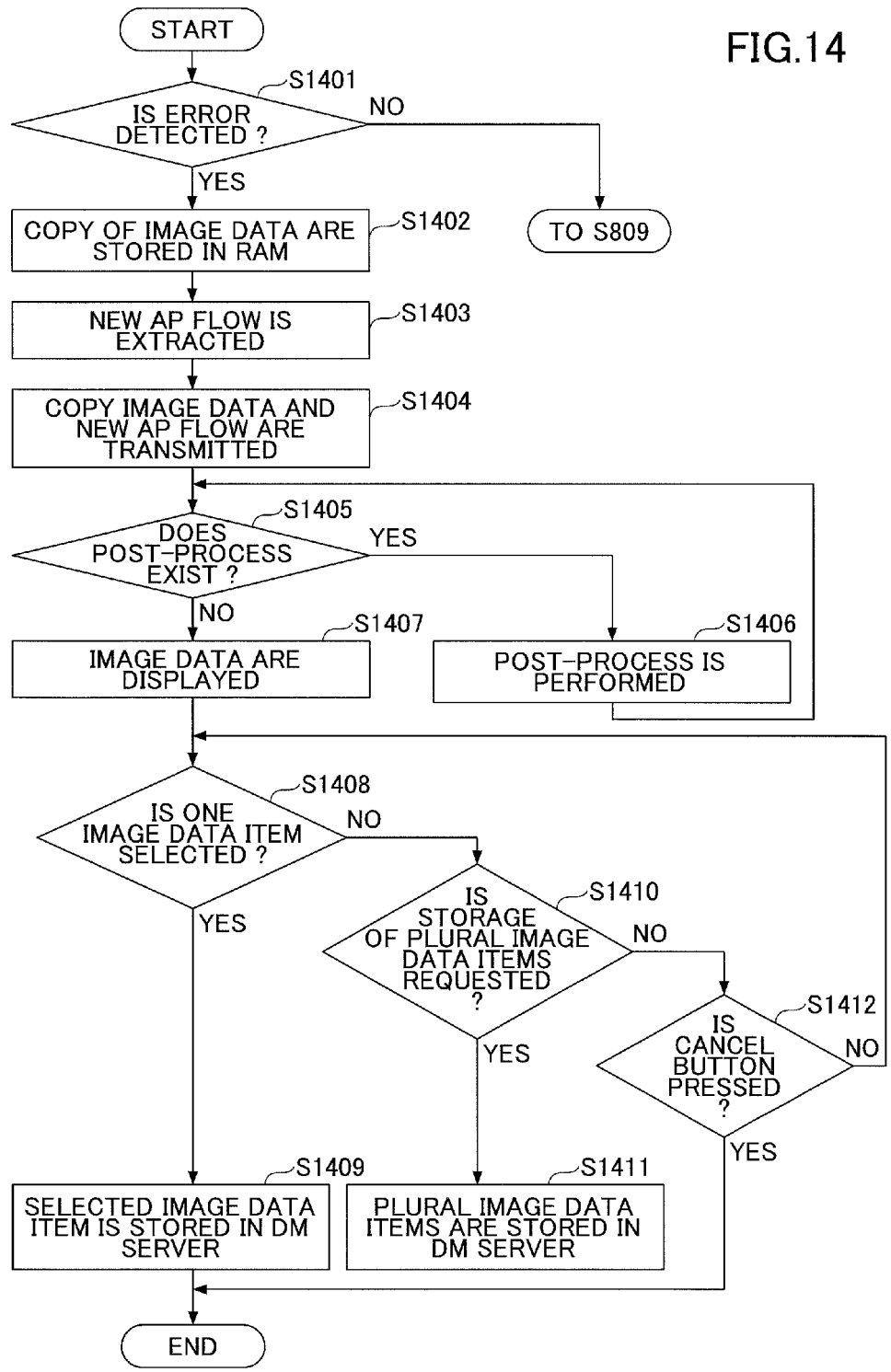
FIG. 14 is a flowchart for explaining operations of the image processing system of the first embodiment when an error is detected in the device which is performing the image processing function.

Next, operation of the image processing system of the present embodiment when an error is detected will be described. FIG. 14 is a flowchart for explaining the operation of the image processing system 100 of the first embodiment when an error in the device which is performing the process is detected. The procedure of FIG. 14 is performed during execution of the step S808 shown in FIG. 8.

In the image processing system 100 of the present embodiment, the AP flow managing server 200 determines whether the error detecting unit 230 has detected an error (step S1401). For example, the error detecting unit 230 in the present embodiment accesses the device which is performing any process in the association process flow, and if no response is received from the device over a predetermined time, the error detecting unit 230 determines that an error in the device is detected.

When no error is detected at the step S1401, the control of the AP flow managing server 200 is transferred to the step S809 described above.

When an error is detected at the step S1401, the AP flow managing server 200 requests a device in the other normally-running association process flow, which performs a process corresponding to the process being performed by the device in which the error is detected, to generate copy data of the image data after the corresponding process is performed (the generated copy data will be called copy image data), and to temporarily store the copy image data in the RAM of that device (step S1402).

Subsequently, the AP flow managing server 200 cancels transmission of the image data and the association process flows to the post-process device with respect to the device in which the error is detected, and extracts a new association process flow (for example, the association process flow-3) (step S1403).

Subsequently, the AP flow managing server 200 adds the newly extracted association process flow to the temporarily stored image data, and transmits the image data and the newly extracted association process flow to the device which performs the first process in the newly extracted association process flow (step S1404).

Subsequently, the AP flow managing server 200 determines whether a post-process exists in the newly extracted association process flow (step S1405). When the post-process exists at the step S1405, the corresponding server performs the post-process (step S1406).

In the following, with reference to FIG. 2B and FIG. 13, the procedure of the steps S1401 to S1406 will be described.

Suppose that the error detecting unit 230 in the AP flow managing server 200 has detected an error in the device which is performing the process of Function-b of the association process flow-1.

In the example of FIG. 2B, the device which performs the process of Function-b in the association process flow-1 is the image forming device 110. Hence, upon detection of the error in the image forming device 110, the AP flow managing server 200 temporarily stores the copy image data after the corresponding process of Function-b is performed by the server 140 which performs the corresponding process of Function-b in the association process flow-2. In this example, it is assumed that the association process flow-2 is normally performed simultaneously with the association process flow-1.

The AP flow managing server 200 cancels the transmission of the image data and the association process flow-1 from the image forming device 110 to the post-process device. In the example of FIG. 2B, the device which performs the post-process of Function-c following the process of Function-b is the server 130. Hence, the transmission of the image data and the association process flow-1 from the image forming device 110 to the server 130 is canceled, and the execution of the association process flow-1 is canceled.

Subsequently, the AP flow determining unit 220 in the AP flow managing server 200 extracts the new association process flow-3 for performing the processes of Function-c and subsequent functions. The association process flow-3 is extracted as an association process flow including all of Function-c and the subsequent functions included in the association process flow-2. The devices which perform the processes included in the association process flow-3 are devices which are not used in the association process flow-2.

In the example of FIG. 13, the processes of Function-c and the subsequent functions included in the association process flow-2 are the processes of Function-c and Function-d. The process of Function-c in the association process flow-2 is performed by the server 120, and the process of Function-d is performed by the server 140.

Hence, the association process flow-3 is extracted as an association process flow in which the processes of Function-c and Function-d are performed by other servers or devices different from the servers 120 and 140. In the example of FIG. 13, the processes of Function-c and Function-d in the association process flow-3 are performed by the server 130. The association process flow-3 is determined based on the server information 91 and the association process flow patterns 95.

After the association process flow-3 is extracted, the association process flow managing server 200 transmits the temporarily stored copy image data (which are received from the server 140) and the association process flow-3 to the device which performs the first process in the association process flow-3. The device which performs the first process in the association process flow-3 is the server 130 which performs the process of Function-c.

In the present embodiment, even if execution of the process of Function-b in the association process flow-1 is canceled, the processes of Function-c and subsequent functions in the image processing are performed by using the association process flow-2 and the association process flow-3. Namely, in the present embodiment, plural association process flows are always executed when the series of image processing functions is performed. Even if an error in the device which performs one association process flow takes place and the image data and the association process flow cannot be output to a post-process device, a backup operation for the image data can be performed by the device which performs the process of the corresponding function in the other association process flow. Therefore, according to the present embodiment, even when an error occurs in the server during execution of the association process function, the series of image processing functions can be performed without interruption.

Referring back to FIG. 14, when it is determined at the step S1405 that no post-process exists, the AP flow managing server 200 displays an image of the image data obtained after the association process flow is executed on the operation unit 112 of the image forming device 110 (step S1407). In the present embodiment, the plural association process flows are performed in parallel, and plural images of image data items after the image processing is performed are present. The plural images corresponding to the plural association process flows are displayed on the operation unit 112. According to the present invention, the device on which the images are displayed may not be limited to the image forming device 110. Alternatively, the device on which the images are displayed may be any other device which can be manipulated by the user.

Figure 15:
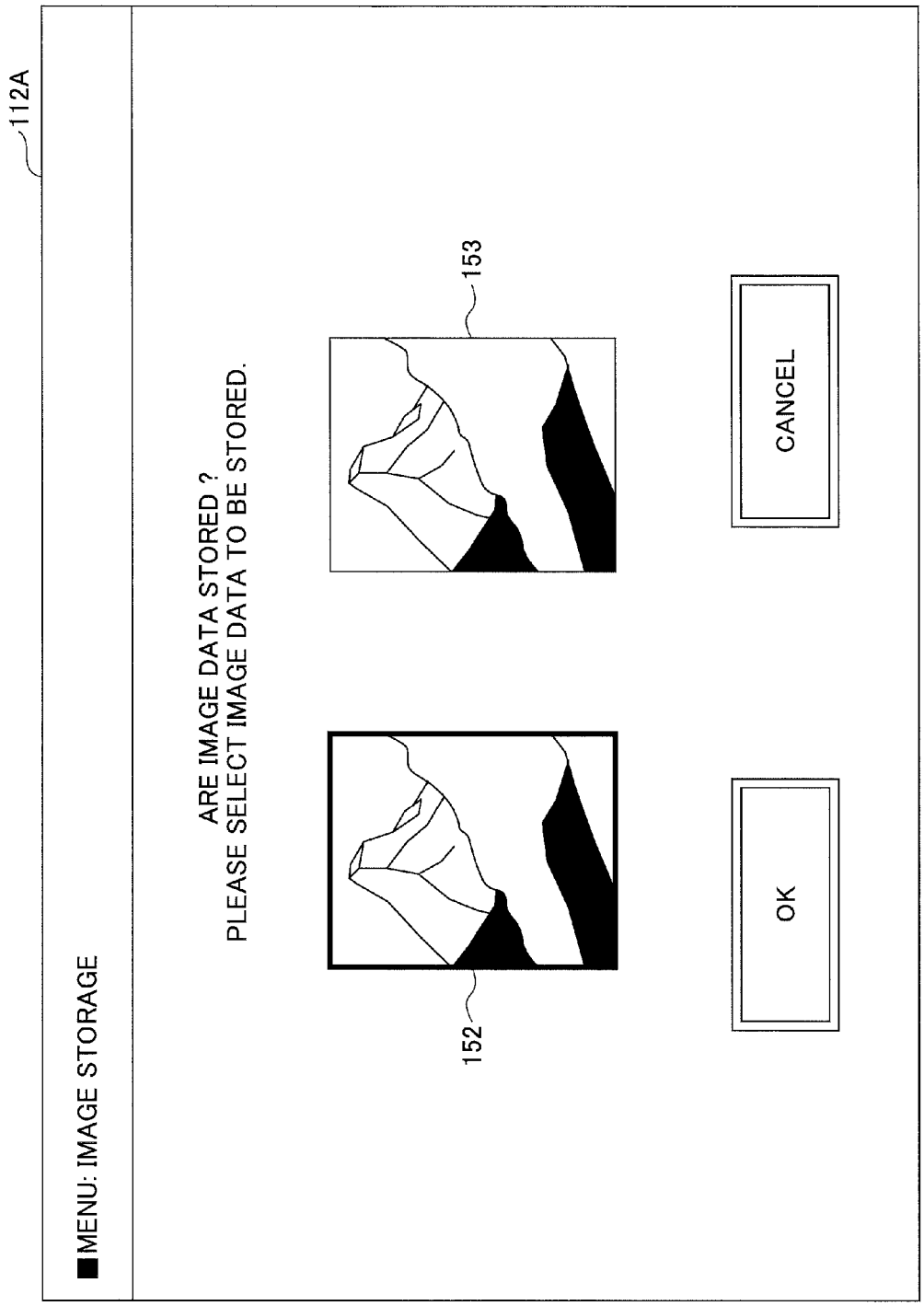
FIG. 15 is a diagram showing an example of a screen in which plural images are displayed in the first embodiment.

FIG. 15 shows an example of a screen in which plural images are displayed in the first embodiment. For example, a screen 112A as shown in FIG. 15 is displayed on the operation unit 112.

In the screen 112A shown in FIG. 15, an image 152 may be obtained using the image data after the image processing is performed according to the association process flow-2, and an image 153 may be obtained using the image data after the image processing is performed according to the association process flow-3.

If plural images are displayed in the image forming device 110, the AP flow managing server 200 determines whether one image data item to be stored in the document managing server 160 is selected (step S1408). When one image data item is selected at the step S1408, the selected image data item is stored in the document managing server 160 (step S1409).

When one image data item is not selected at the step S1408, the AP flow managing server 200 determines whether storing of plural image data items is requested (step S1410). When storing of plural image data items corresponding to the association process flows is requested at the step S1410, the AP flow managing server 200 stores the plural image data items in the document managing server 160 (step S1411).

When storing of plural image data items is not requested at the step S1410, the AP flow managing server 200 determines whether storing of the image data is canceled (step S1412). When the storing of the image data is canceled at the step S1412, the AP flow managing server 200 terminates the procedure of FIG. 14.

When the storing of the image data is not canceled at the step S1412, the control of the AP flow managing server 200 is returned to the step S1408.

As described in the foregoing, plural association process flows are always carried out for performing a series of image processing functions, so that even when an error occurs in the server during execution of an association process function, it is possible to perform the image processing functions without interruption. The foregoing embodiment may be applied when all the servers contained in the image processing system 100 support the color image processing functions. Alternatively, the foregoing embodiment may be applied when all the servers support only the monochrome image processing functions.

Next, a second embodiment of the present disclosure will be described. The second embodiment of the present disclosure will be described with respect to a case in which some servers support the color image processing functions and other servers support only the monochrome image processing functions.

In the following embodiment, the elements which are essentially the same as corresponding elements in the previously described first embodiment are designated by the same reference numerals, and a description thereof will be omitted.

Figure 16A:
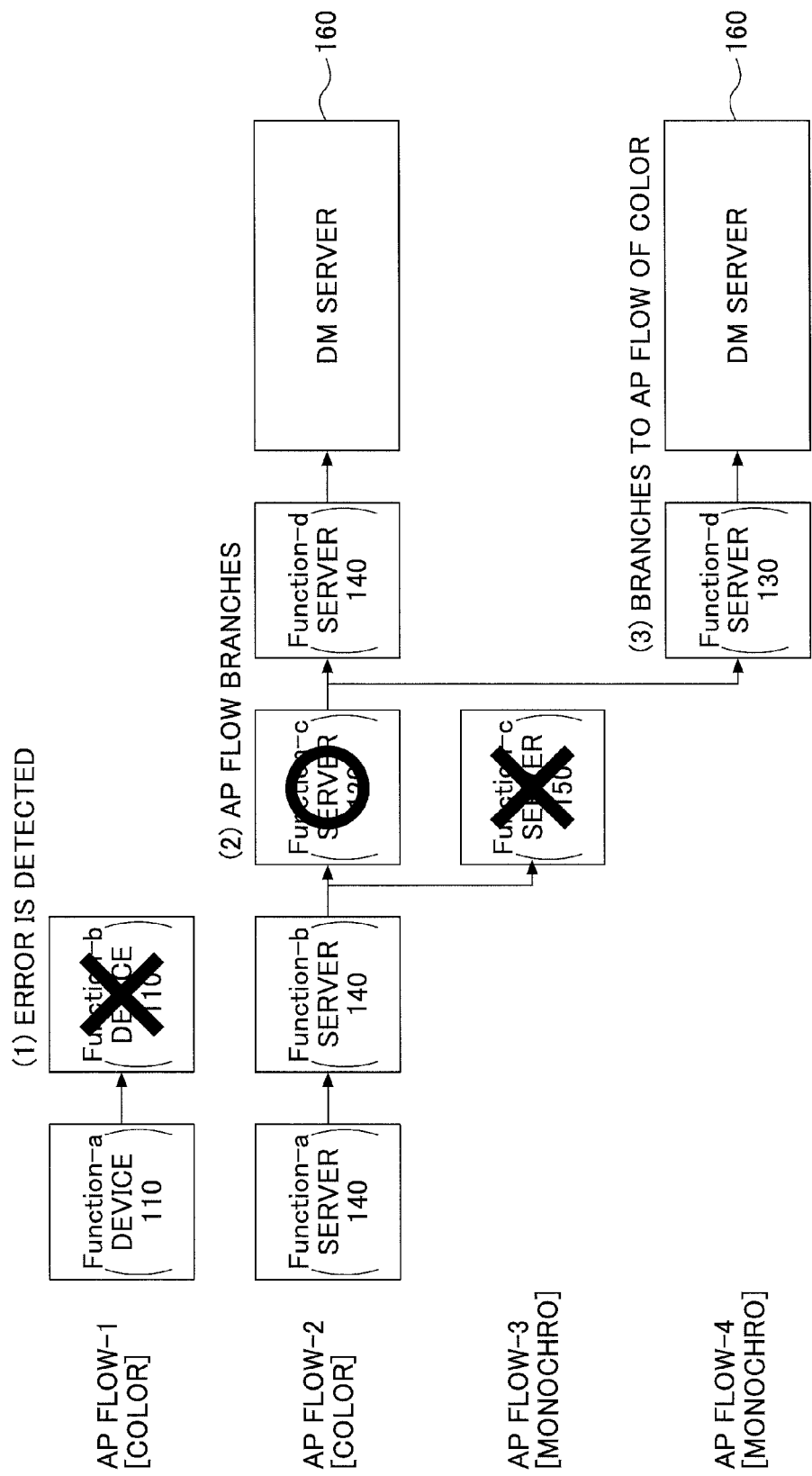

FIG. 16A and FIG. 16B are diagrams for explaining cases where an error in a device which is performing processing is detected in the second embodiment. FIG. 16A show the case in which the association process flow temporarily branches to the monochrome image processing device (server 150), but returns to the color image processing device (server 130). FIG. 16B shows the case in which the association process flow branches to the monochrome image processing device (server 150) and does not return to the color image processing device.

In the present embodiment, it is assumed that the image forming device 110 and the servers 120, 130 and 140 support the color image processing functions, and the server 150 supports only the monochrome image processing functions. It is assumed that the image data read out by the image forming device 110 are color image data. It is assumed that the AP flow determining unit 220 is able to determine whether the association process flow is applicable to color images and determine whether the association process flow is applicable only to monochrome images.

As shown in FIG. 16A, an error in the image forming device 110 which is performing the process of Function-b in the association process flow-1 is detected. The association process flow-3 for performing the processes of Function-c and Function-d in the association process flow-2 is extracted.

If the available server at this time is only the server 150 which supports only the monochrome image processing functions, the AP flow determining unit 220 selects the server 150 as a server which performs the association process flow-3. The AP flow determining unit 220 outputs the temporarily stored copy image data (which are received from the server 140) and the association process flow-3 to the server 150.

Even when the process of Function-c following the process of Function-b in the association process flow-2 is performed, the AP flow managing server 200 of the present embodiment is arranged to temporarily store the copy image data, in preparation for the case where the server supporting the color image processing functions becomes available. In the case of FIG. 16A, the process of Function-c in the association process flow-2 is performed by the server 120. Hence, the copy image data after the process of Function-c is performed is stored in the server 120.

Moreover, in the present embodiment, when the server supporting the color image processing functions becomes available after the process of Function-c is performed, the association process flow-3 is stopped and the control is returned to the association process flow-4 in which the process of Function-d is performed by the server supporting the color image processing functions.

In the case of FIG. 16A, after the process of Function-c is performed, the server 130 supporting the color image processing functions becomes available, and the association process flow-4 in which the process of Function-d is performed by the server 130 is extracted.

In this case, both the image data output according to the association process flow-2 and the image data output according to the association process flow-4 are color image data.

In the case of FIG. 16B, after the association process flow-3 which supports only the monochrome image processing functions is extracted, the server supporting the color image processing functions does not become available. In this case, the image data output according to the association process flow-2 are color image data, and the image data output according to the association process flow-3 are monochrome image data.

Next, operation of the image processing system 100 in the present embodiment when an error in a device which is performing an image processing process is detected will be described. FIG. 17A and FIG. 17B are a flowchart for explaining operations of the image processing system in the second embodiment when an error in the device which is performing the image processing function is detected. The operations of the image processing system 100 shown in FIG. 17A and FIG. 17B will be described with reference to the examples of FIG. 16A and FIG. 16B.

Steps S1701 to S1703 in FIG. 17A are the same as the steps S1401 to S1403 in FIG. 14, and a description thereof will be omitted.

After the step S1703 is performed, the AP flow determining unit 220 determines whether an association process flow of color image exists in the extracted new association process flow (step S1704).

When the association process flow of color image exists at the step S1704, the control is transferred to step S1708 which will be described later.

When the association process flow of color image does not exist at the step S1704, the AP flow managing server 200 outputs the copy image data (after the process of Function-b in the association process flow-2 is performed) and the association process flow-3 to the server 150 (step S1705). Subsequently, after the process of Function-c in the association process flow-2 is performed, the AP flow managing server 200 generates the copy image data (received from the server 120) and temporarily stores the copy image data (step S1706).

Subsequently, the AP flow managing server 200 determines whether a post-process exists (step S1707). When it is determined at the step S1707 that the post-process exists, the control of the AP flow managing server 200 is returned to the step S1703.

When it is determined at the step S1707 that no post-process exists, the control is transferred to step S1711 of FIG. 17B which will be described later.

Steps S1708 to S1716 of FIGS. 17A and 17B are the same as the steps S1404 to S1412 of FIG. 14 and a description thereof will be omitted.

As shown in FIG. 17B, when the storing of the image data is canceled at step S1716, the AP flow determining unit 220 in the AP flow managing server 200 determines whether the association process flow which supports the color image processing functions exists (step S1717). When it is determined at the step S1717 that the association process flow of color image does not exist, the image processing system 100 terminates the procedure.

When it is determined at the step S1717 that the association process flow of color image exists, a check message indicating the rerun of the association process flow is displayed on the operation unit 112 of the image forming device 110 (step S1718). The AP flow managing server 200 detects whether the cancel button is pressed or not (step S1719).

When the cancel button is pressed at the step S1719, the image processing system 100 terminates the procedure. When the cancel button is not pressed at the step S1719, the control of the AP flow managing server 200 is returned to the step S1703.

Figure 18:
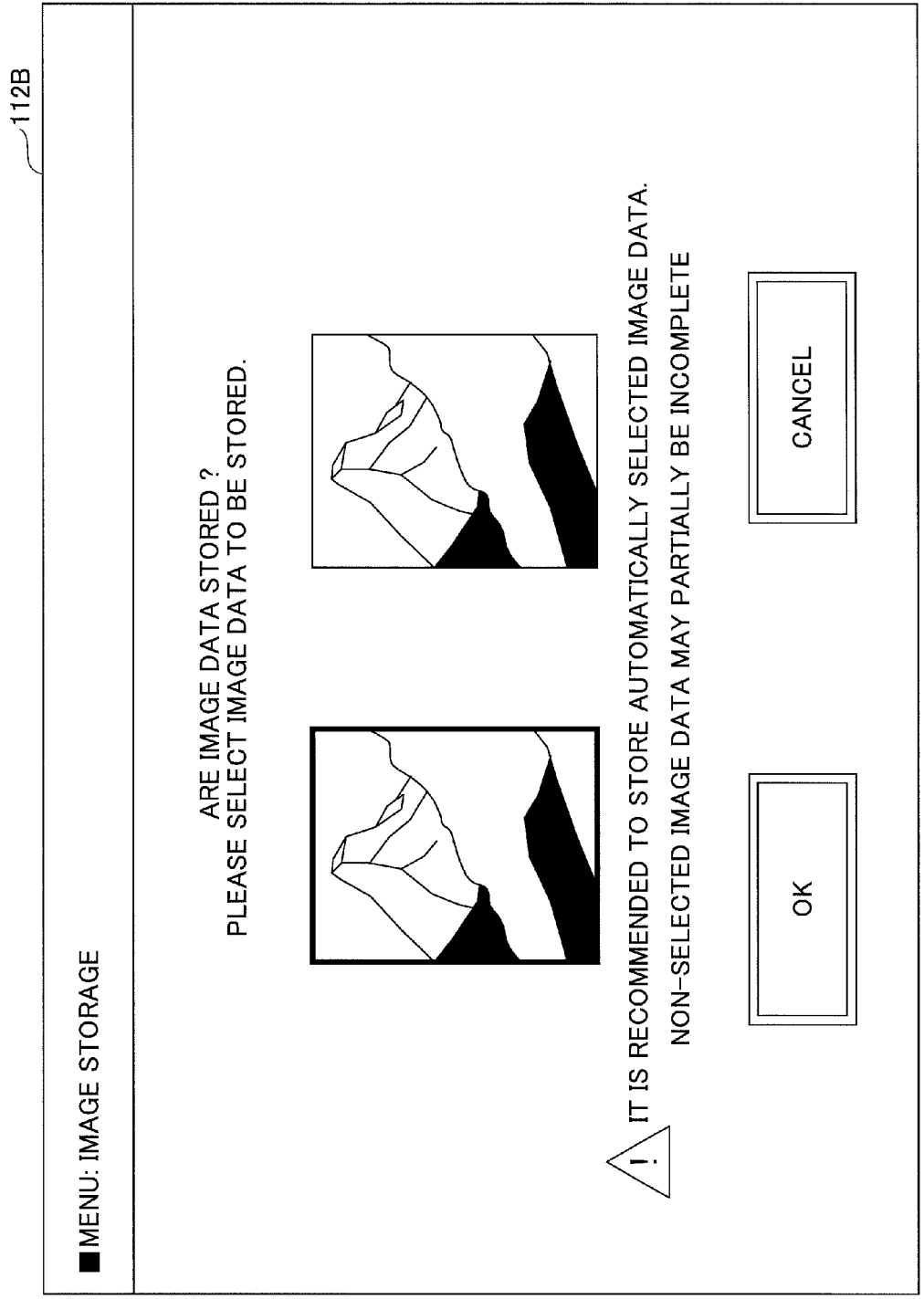
FIG. 18 is a diagram showing an example of a screen where plural images are displayed in the second embodiment.

FIG. 18 shows an example of the screen where plural images are displayed in the second embodiment. For example, a screen 112B as shown in FIG. 18 is displayed on the operation unit 112. This screen is displayed at the step S1714 described above.

The images displayed on the screen 112B include the image data which are output according to the association process flow of color image, and the image data which are output according to the association process flow of monochrome image. Hence, a message indicating that storing of the image data output by the association process flow of color image is recommended may be displayed.

Alternatively, the above embodiment may be modified so that without displaying the two images, the image data output according to the association process flow of color image are automatically stored in the document managing server 160.

Figure 19:
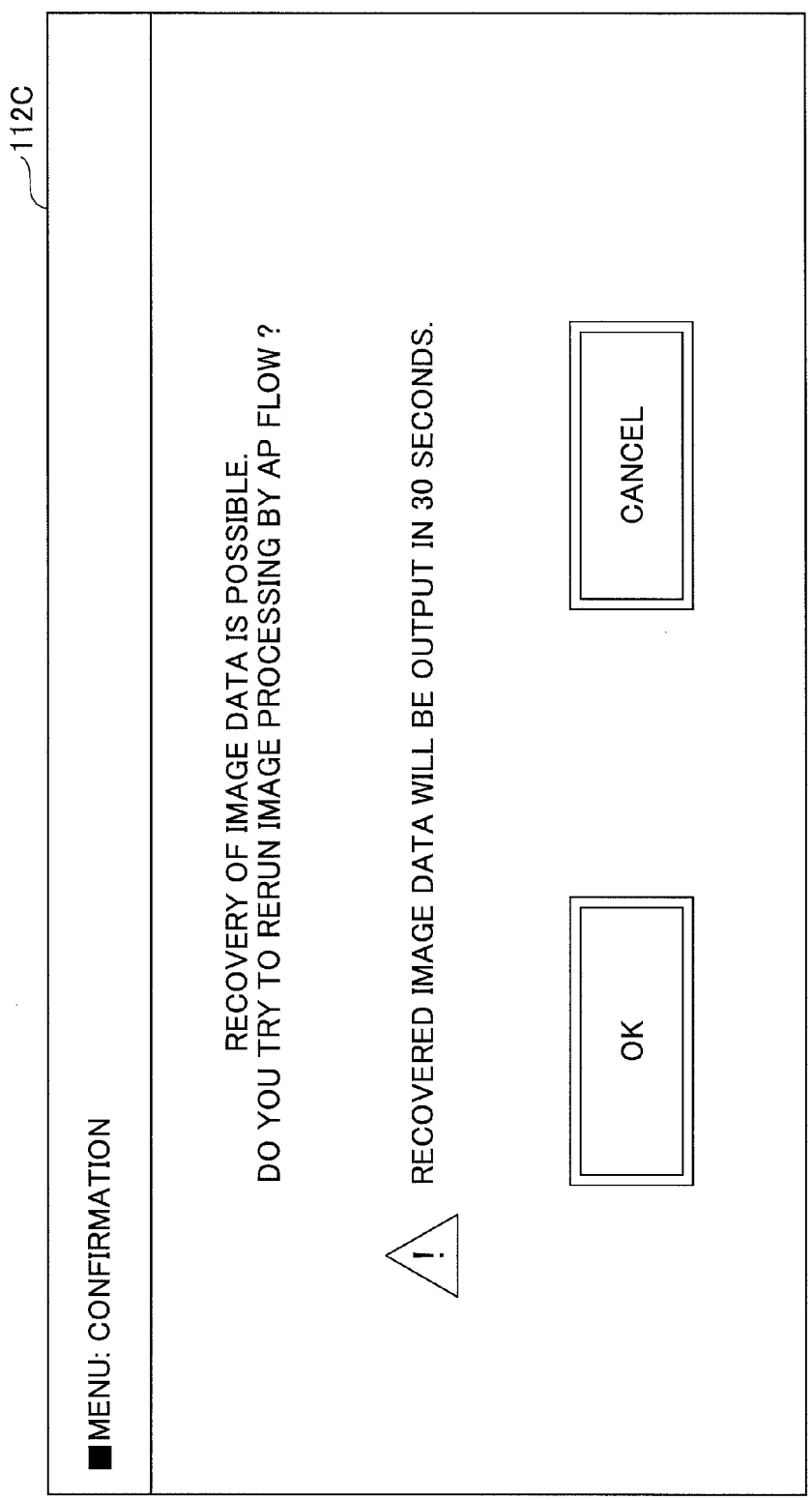
FIG. 19 is a diagram showing an example of a screen in which a user is prompted to select an option for rerunning the association process flow in the second embodiment.

FIG. 19 shows an example of a screen in which a user is prompted to select an option for rerunning the association process flow in the second embodiment. For example, a screen 112C as shown in FIG. 19 is displayed on the operation unit 112 of the image forming device 110. The screen 112C is displayed at the step S1721 described above. In the present embodiment, the time for outputting the image data according to the association process flow of color image may be displayed in the screen 112C.

In the present embodiment, the processes of Functions-a, -b, -c and -d performed by the devices supporting the color image processing functions, and the processes of Functions-a, -b, -c and -d performed by the devices supporting only the monochrome image processing functions are the same processes but include different parameters.

As described above, in the foregoing embodiment, when the input image data are color image data and the association process flow branches to the association process flow for supporting the monochrome image processing functions only, returning to the association process flow for supporting the color image processing is allowed.

Next, a third embodiment of the present disclosure will be described. The third embodiment of the present disclosure will be described with respect to a case where only monochrome image data are finally output.

In the following embodiment, the elements which are essentially the same as corresponding elements in the previously described first embodiment are designated by the same reference numerals, and a description thereof will be omitted.

Figure 20:
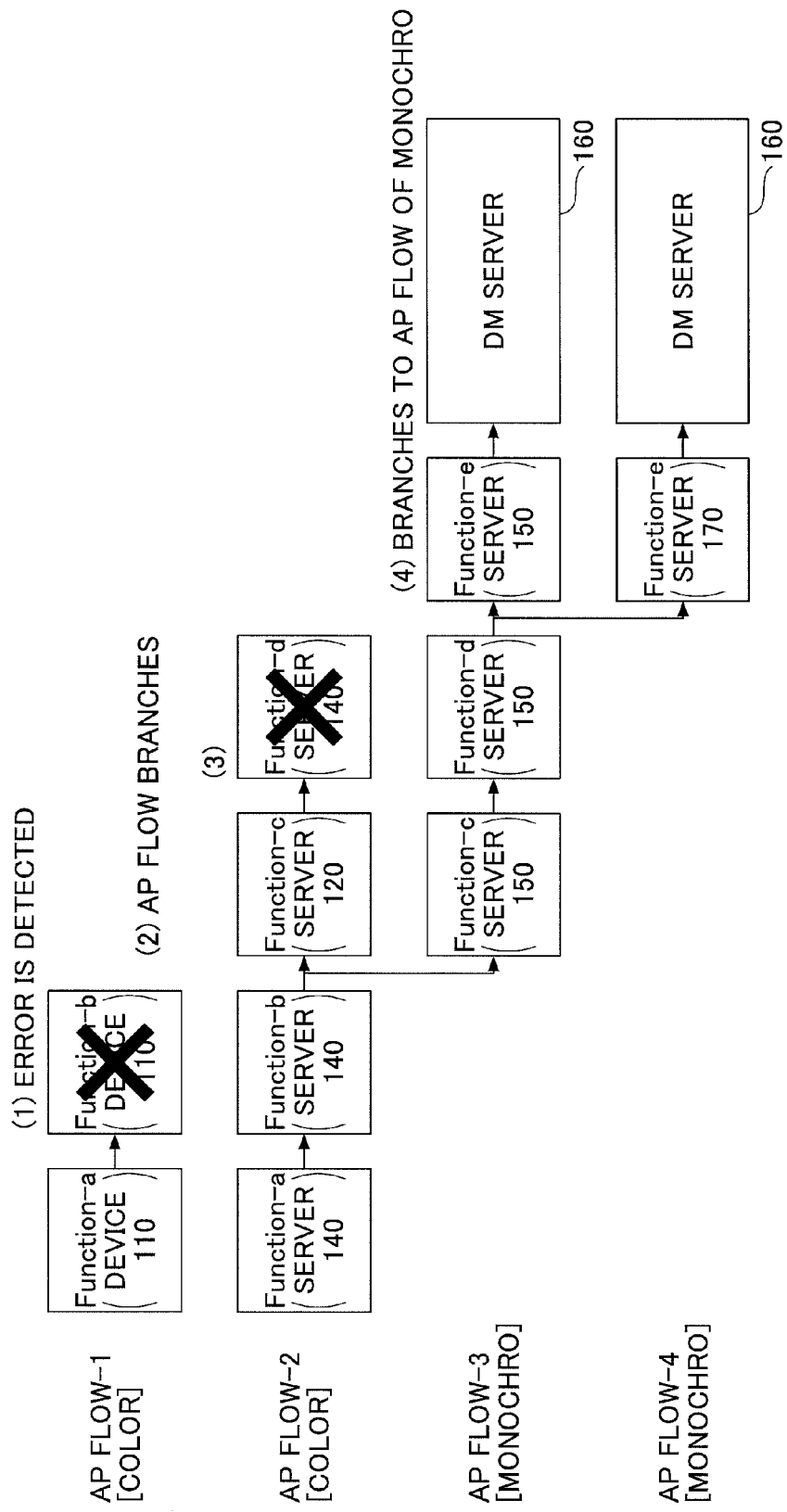
FIG. 20 is a diagram explaining a case where an error in a device which is performing an image processing function is detected in a third embodiment of the present disclosure.

FIG. 20 is a diagram for explaining a case where an error in a device which is performing an image processing function is detected in the third embodiment.

It is assumed that the image processing system 100 of the present embodiment supports only the monochrome image processing functions and includes a server 170 which performs the process of Function-e.

In the case of FIG. 20, an error in the image forming device 110 which is performing the process of Function-b in the association process flow-1 is detected, and the association process flow-2 branches to the association process flow-3. The association process flow-3 supports only the monochrome image processing functions.

Subsequently, an error in the server 140 which is performing the process of Function-d in the association process flow-2 is detected. The AP flow managing server 200 generates the copy image data (received from the server 150 after the process of Function-d in the association process flow-3 is performed) and temporarily stores the copy image data.

Subsequently, the AP flow determining unit 220 extracts a new association process flow for performing the process following the process of Function-d in the association process flow-3. The copy image data stored in the server 150 at this time are monochrome image data. Hence, the AP flow determining unit 220 extracts the association process flow-4 which supports only the monochrome image processing functions.

In the association process flow-4, the process of Function-e following the process of Function-d is performed by the server 170 supporting only the monochrome image processing functions, and the output image data are stored in the document managing server 160.

Hence, in the present embodiment, both the image data output according to the association process flow-3 and the image data output according to the association process flow-4 are monochrome image data. In this case, when the output image data are stored in the document managing server 160, a screen as shown in FIG. 21 may be displayed on the operation unit 112 of the image forming device 110.

Figure 21:
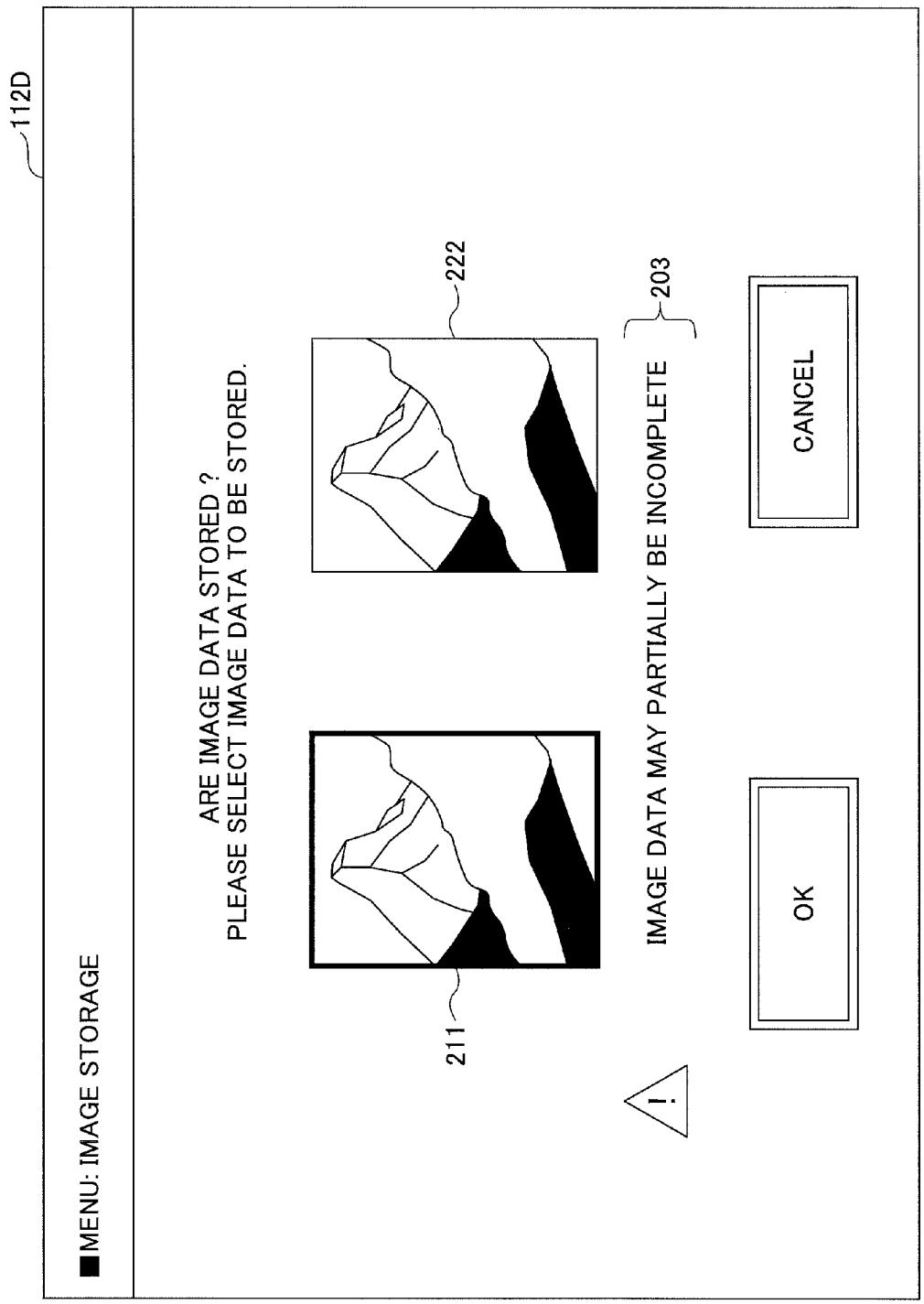
FIG. 21 is a diagram showing an example of a screen in which plural images are displayed in the third embodiment.

FIG. 21 shows an example of a screen where plural images are displayed in the third embodiment.

As shown in FIG. 21, in the screen 112D, the image 221 output according to the association process flow-3 and the image 222 output according to the association process flow-4 are not of color image data. For this reason, a warning message 223 indicating that the image data may be partially incomplete may be displayed on the operation unit 112 of the image forming device 110.

According to the server device of the present disclosure, even when an error occurs in an external device which is performing an image processing function, it is possible to perform without interruption the image processing by the association process flow.

The server device of the present disclosure is not limited to the specifically disclosed embodiments, and variations and modifications may be made without departing from the scope of the present disclosure.

The present application is based upon and claims the benefit of priority of Japanese Patent Application No. 2011-272417, filed on Dec. 13, 2011, the contents of which are incorporated herein by reference in their entirety.

What is claimed is:

1. A server device for managing an association process flow to perform image processing including plural processes on image data by association of plural external devices, comprising:

an external device information managing unit configured to manage external device information regarding the external devices; and an association process flow determining unit configured to,
determine an association process flow that defines how the processes in the image processing are performed on image data by the external devices, based on the external device information,
determine a plurality of association process flows for the image processing, the determined plurality of association process flows include at least first and second association process flows such that a first plurality of external devices defined in the first association process flow differ from a second plurality of external devices defined in the second association process flow, and the first association process flow and the second association process flow are performed in parallel, branch out to a new association process flow when an error is detected in one of (i) the first plurality of external devices during the first association process flow and (ii) the second plurality of external devices during the second association process flow, the new association process flow defining a new plurality of external devices that are different from the second plurality of external devices, perform the image processing without interruption according to the new association process flow, and return back to one of the first association process flow and the second association process flow when the one of the new plurality of external devices does not support an image process function required by the image processing.

2. The server device according to claim 1, further comprising an error detecting unit configured to detect an error in any of the external devices, wherein, when the error detecting unit detects an error in one of the external devices in the first association process flow, the association process flow determining unit determines a third association process flow different from the first and second association process flows, and transmits, to an external device in the second association process flow which performs a process corresponding to a process being performed by the one of the external devices, a request for generating copy data of the image data after the corresponding process is performed and for temporarily storing the copy data.

3. The server device according to claim 2, wherein the third association process flow includes all processes which are performed by external devices following the one of the external devices in the first association process flow.

4. The server device according to claim 2, wherein the association process flow determining unit is configured to determine the third association process flow based on a result of determination as to whether the first and second association process flows support color image processing functions or support monochrome image processing functions only.

5. A method of determining association process flows by a server device which manages an association process flow to perform image processing including plural processes on image data by association of plural external devices, the method comprising:

managing, by an external device information managing unit, external device information regarding the external devices;

determining, by an association process flow determining unit, an association process flow that defines how the processes in the image processing are performed on image data by the external devices, based on the external device information, the determining includes determining a plurality of association process flows for the image processing, the determined plurality of association process flows include at least first and second association process flows such that a first plurality of external devices defined in the first association process flow differ from a second plurality of external devices defined in the second association process flow, and the first association process flow and the second association process flow are performed in parallel;

branching out to a new association process flow when an error is detected in one of (i) the first plurality of external devices during the first association process flow and (ii) the second plurality of external devices during the second association process flow, the new association process flow defining a new plurality of external devices that are different from the second plurality of external devices;

performing the image processing without interruption according to the new association process flow; and returning back to one of the first association process flow and the second association process flow when the one of the new plurality of external devices does not support an image process function required by the image processing.

6. A non-transitory computer-readable recording medium storing a program which, when executed by a computer, causes the computer to perform the method of claim 5.

7. An image processing system including plural external devices and a server device which manages an association process flow to perform image processing including plural processes on image data by association of plural external devices, the server device comprising:

an external device information managing unit configured to manage external device information regarding the external devices; and an association process flow determining unit configured to, determine an association process flow that defines how the processes in the image processing are performed on image data by the external devices, based on the external device information, determine a plurality of association process flows for the image processing, the determined plurality of association process flows include at least first and second association process flows such that a plurality of first external devices defined in the first association process flow differ from a plurality of second external devices defined in the second association process flow, and the first association process flow and the second association process flow are performed in parallel, branch out to a new association process flow when an error is detected in one of (i) the first plurality of external devices during the first association process flow and (ii) the second plurality of external devices during the second association process flow, the new association process flow defining a new plurality of external devices that are different from the second plurality of external devices, perform the image processing without interruption according to the new association process flow, and return back to one of the first association process flow and the second association process flow when the one of the new plurality of external devices does not support an image process function required by the image processing.

* * * * *